(12) United States Patent
Murphy et al.

(10) Patent No.: US 10,024,070 B2
(45) Date of Patent: Jul. 17, 2018

(54) SYSTEM TO DETER EXTERNAL CLIMBING OF OPEN STAIRS

(71) Applicants: Richard B. Murphy, San Diego, CA (US); Barbara H. Murphy, San Diego, CA (US)

(72) Inventors: Richard B. Murphy, San Diego, CA (US); Barbara H. Murphy, San Diego, CA (US)

( * ) Notice: Subject to any disclaimer, the term of this patent is extended or adjusted under 35 U.S.C. 154(b) by 0 days.

(21) Appl. No.: 14/886,030

(22) Filed: Oct. 17, 2015

(65) Prior Publication Data

US 2016/0138284 A1 May 19, 2016

Related U.S. Application Data

(63) Continuation-in-part of application No. 14/719,268, filed on May 21, 2015, now Pat. No. 9,915,077.

(60) Provisional application No. 62/151,351, filed on Apr. 22, 2015, provisional application No. 62/071,820, filed on Oct. 3, 2014, provisional application No. 61/997,076, filed on May 21, 2014.

(51) Int. Cl.
*E04G 21/30* (2006.01)
*E04F 11/16* (2006.01)
*E04F 11/18* (2006.01)
*E04F 11/02* (2006.01)

(52) U.S. Cl.
CPC ............ *E04G 21/30* (2013.01); *E04F 11/163* (2013.01); *E04F 11/1861* (2013.01); *E04F 2011/0203* (2013.01)

(58) Field of Classification Search
CPC .... E04G 21/30; E04F 11/1861; E04F 11/163; E04F 2011/0203; E04B 1/72
See application file for complete search history.

(56) References Cited

U.S. PATENT DOCUMENTS

| | | | | |
|---|---|---|---|---|
| 4,155,540 A | * | 5/1979 | Horgan, Jr. ......... | E04F 11/1851 256/23 |
| 4,556,201 A | * | 12/1985 | Turner ................ | E04F 11/1863 248/251 |
| 4,852,194 A | * | 8/1989 | Langan ................ | A47D 15/005 256/23 |
| 5,076,545 A | * | 12/1991 | Bodzin ............... | E04F 11/1851 256/1 |
| 5,337,528 A | * | 8/1994 | Jaworski ............. | E04F 11/1863 256/21 |
| 5,347,774 A | * | 9/1994 | Smith ...................... | B27M 3/12 144/354 |
| 5,533,715 A | * | 7/1996 | Dandrea ................ | E01F 13/022 160/351 |
| 5,632,124 A | * | 5/1997 | Weingarten ........... | E04F 11/032 182/187 |
| 5,660,009 A | * | 8/1997 | Cousin ................... | E04F 11/112 52/182 |

(Continued)

*Primary Examiner* — Paola Agudelo
(74) *Attorney, Agent, or Firm* — Richard B. Murphy

(57) ABSTRACT

The present invention provides a guard which is a surface that is adapted for mounting over the open end of the tread of a step of an open stairway such that when associated with a stairway: the exposed area of the OTEP is reduced. The present invention further provides for a retention means to maintain stable association of the guard with the stairway. The present invention further comprises kits comprising one or more guards, one or more retention means and instructions for use.

14 Claims, 16 Drawing Sheets

(56) References Cited

U.S. PATENT DOCUMENTS

| | | | | |
|---|---|---|---|---|
| 5,720,136 A * | 2/1998 | Turner | E04F 11/02 | 52/182 |
| 5,916,091 A * | 6/1999 | Schultz | E04H 3/123 | 182/129 |
| 5,921,031 A * | 7/1999 | Williams | E04H 3/123 | 160/333 |
| 6,059,269 A * | 5/2000 | Ross | E04F 11/1842 | 256/21 |
| 6,205,722 B1 * | 3/2001 | Bromley | E04F 11/025 | 52/182 |
| 7,165,362 B2 * | 1/2007 | Jobs | B32B 17/10009 | 52/179 |
| 8,336,236 B2 * | 12/2012 | Boltz | G09F 15/0025 | 40/603 |
| 2006/0180284 A1 * | 8/2006 | Wiggins | E06B 9/02 | 160/368.1 |
| 2006/0225960 A1 * | 10/2006 | Ferlin | E04G 1/15 | 182/138 |
| 2007/0144084 A1 * | 6/2007 | Barry | B27M 3/12 | 52/187 |
| 2007/0234653 A1 * | 10/2007 | Ringness | E04F 11/025 | 52/182 |
| 2009/0188182 A1 * | 7/2009 | Iannotta | E04F 11/1842 | 52/182 |
| 2013/0247302 A1 * | 9/2013 | Chacon | G01V 3/088 | 5/613 |
| 2014/0138035 A1 * | 5/2014 | Potter | E04B 2/7427 | 160/135 |
| 2014/0318891 A1 * | 10/2014 | Crothers | E04G 5/14 | 182/113 |

* cited by examiner

SYSTEM TO DETER EXTERNAL CLIMBING OF OPEN STAIRS

CROSS REFERENCE TO OTHER APPLICATIONS

This application is a continuation-in-part of and claims the benefit pursuant to 35 U.S.C. 120 of U.S. patent application Ser. No. 14/719,268 filed May 21, 2015 which is related to and claims the benefit pursuant to 35 U.S.C. 119 of U.S. Provisional Patent Application Ser. No. 61/997,076 filed May 21, 2014, U.S. Provisional Patent Application Ser. No. 62/071,820 filed Oct. 3, 2014, and U.S. Provisional Patent Application Ser. No. 62/151,351 filed Apr. 22, 2015.

BACKGROUND OF THE INVENTION

Many homes provide open stairways, i.e. a stairway configuration where at least one side of the stairway does not terminate at a wall. It is well known that children will climb the outside of such open stairways, generally by standing on the area of the tread that protrudes beyond and/or between the balusters and climbing these surfaces, in some cases holding on to the balustrade.

The risk of injury or death arising from this activity is significant. While there are many devices available to prevent human beings and animals from the unwanted climbing of stairways (e.g. security gates that block access to the central portion of the stairway between the balustrade(s) and/or wall(s) or walkline of the stairway) none of these devices prevent children from climbing the outside of open stairways. The present invention addresses this need.

SUMMARY OF THE INVENTION

The present invention provides a guard that is adapted for mounting over the open end(s) of the tread(s) of a step(s) of an open stairway. When affixed to said stairway, said guard substantially reduces the exposed surface of the open end(s) of the tread(s) of a step(s) of an open stairway. In one embodiment, the guard is affixed to the stairway such that: (a) the lower portion of the guard is in contact with the outer edge(s) of the tread(s) and (b) the upper portion of the guard contacts at least one baluster, and (c) the exposed area of the OTEP is reduced. The present invention further provides for a retention means to maintain stable association of the guard with the stairway. The invention further provides a method of preventing the external climbing of open stairways by a human being or animal through the use of a guard that substantially reduces the exposed surface of the open end(s) of the tread(s) of a step(s) of an open stairway. The present invention further comprises kits comprising one or more guards, one or more retention means and instructions for use.

DETAILED DESCRIPTION

Figure 1:
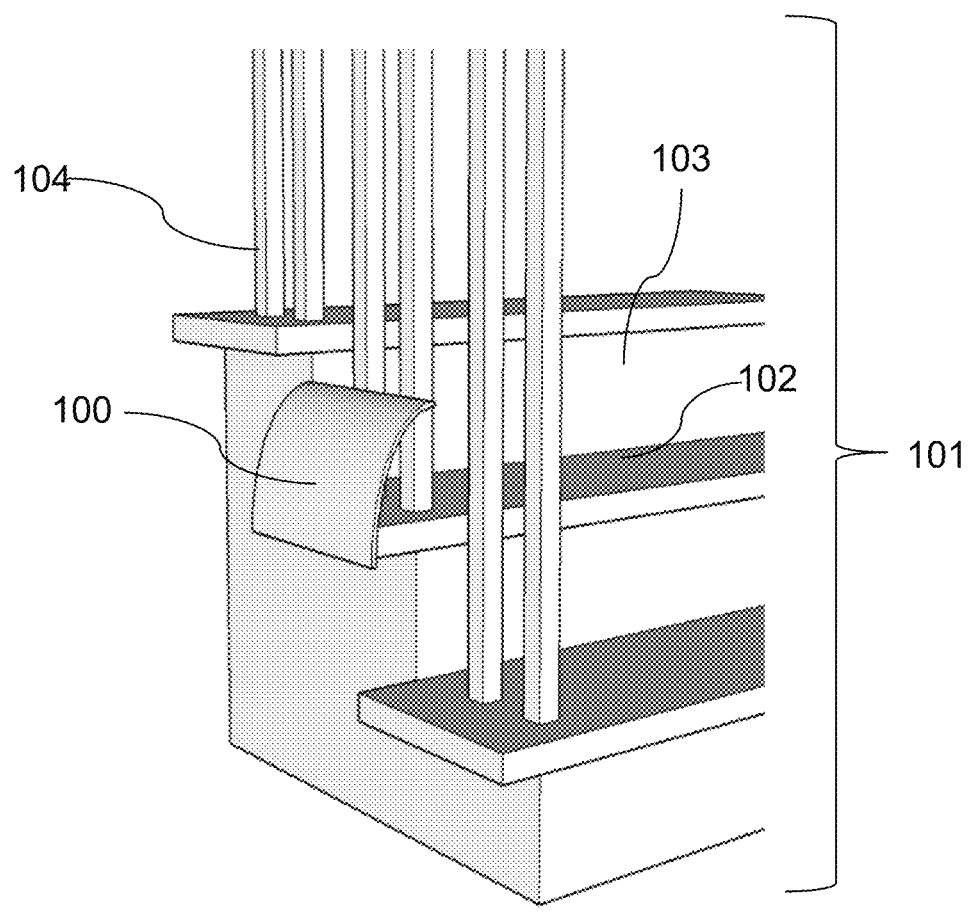
FIG. 1 is a front perspective view of one embodiment of a guard of the present invention in association with an open stairway.

Detailed embodiments of the present invention are disclosed herein. However, it is to be understood that the disclosed embodiments are merely illustrative of the invention, which may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention. Furthermore, any section headings are merely for convenience of the reader and not intended to provide a limitation on the scope of the disclosure with respect to any feature of utility of the present invention.

The present invention provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway. The present invention also provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway wherein the guard reduces the exposed surface of the OTEP of one tread. The present invention also provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway wherein the guard reduces the exposed surface of the OTEP of 2 or more treads of an open stairway. The present invention also provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway reduces the exposed surface of the OTEP of 3 or more treads of an open stairway. The present invention also provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway wherein said retention means is selected from the group consisting of fasteners, adhesives, cable ties, elastic materials, Christmas tree fasteners, hook and loop fasteners, and spreader bars. The present invention further provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway and a vertical drape and a retention means for said vertical drape to maintain said drape in stable association with said open stairway. The present invention also provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway, a vertical drape and a retention means for said vertical drape to maintain said drape in stable association with said open stairway, and a handrail guard and retention means to maintain said handrail guard in stable association with said open stairway. The present invention also provides an apparatus for association with an open stairway to reduce the exposed surface of the OTEP of at least one tread of one step of said open stairway, said apparatus comprising a guard for mounting over the open end of at least one tread of a step of said open stairway and a retention means to maintain said guard in stable association with said open stairway and an alarm system that provides an audible signal when pressure is applied to said guard, said alarm system comprising an audible signal generator in electrical communication with a pressure sensitive switch and a power supply.

The present invention also provides a kit of parts comprising at least one guard for mounting over the open end of at least one tread of a step of said open stairway, a retention means to maintain the guard in stable association with said open stairway, and instructions for use. The present invention also provides a kit of parts comprising at least one guard for mounting over the open end of at least one tread of a step of said open stairway, a retention means to maintain the guard in stable association with said open stairway, a drape and retention means for said drape to maintain said drape in stable association with said open stairway, and instructions for use. The present invention also provides a kit of parts comprising at least one guard for mounting over the open end of at least one tread of a step of said open stairway, a retention means to maintain the guard in stable association with said open stairway, a drape and retention means for said drape to maintain the drape in stable association with the open stairway, a handrail guard and retention means for said handrail guard to maintain the handrail guard in stable association with said open stairway, and instructions for use. The present invention provides a kit of parts comprising at least one guard for mounting over the open end of at least one tread of a step of said open stairway, a retention means to maintain the guard in stable association with said open stairway, a stairway gate, and instructions for use.

The present invention further provides a method of deterring or preventing the external climbing of an open stairways by human being or animal said method comprising fitting said open stairway with an apparatus comprising a guard for mounting over the open end of at least one tread of a step of said open stairway and a retention means to maintain the guard in stable association with said open stairway such that the exposed surface of the OTEP is reduced. The present invention provides a method of preventing the external climbing of an open stairways by a human being or animal said method comprising fitting said open stairway with an apparatus comprising a guard for mounting over the open end of at least one tread of a step of said open stairway and a retention means to maintain the guard in stable association with said open stairway such that the exposed surface of the OTEP is reduced and a vertical drape that is fitted to the outer surface of the balustrade and extends upward from the upper edge of said guard to a point below the handrail. The present invention further provides a method of deterring or preventing the external climbing of an open stairways by a human being or animal said method comprising fitting said open stairway with an apparatus comprising a guard for mounting over the open end of at least one tread of a step of said open stairway and a retention means to maintain the guard in stable association with said open stairway such that the exposed surface of the OTEP is reduced and a vertical drape that is fitted to the outer surface of the balustrade and extends upward from the upper edge of said guard to a point below the handrail and a handrail guard.

Definitions

The following terms are used in the description of the present invention:

The term "step" as used herein is composed of a tread and a riser.

The term "stairway" as used herein means a series of more than one step. As a matter of convention, the number of stairs in a stairway is measured by the number of risers, not treads. A straight stairway is a stairway that proceeds in a straight line when viewed from the centerline of the stairway and the surface of the treads are substantially rectangular in shape. A curved stairway is a stairway in which the treads are winders. A circular stairway is an example of a curved stairway.

The term "tread" as used herein refers to the portion of the stairway that is stepped on. The "tread depth" is measured from the leading edge of the tread to the riser in the direction of the stairway. In the event that the stairway does not provide a riser element between each stair, the tread depth is the distance from the leading edge to the trailing edge of each tread. The "tread width" is the distance measured from one side to another including any portion that extends beyond the balusters. Sometimes the exposed portion of the tread in an open stairway is fitted with a decorative trim piece of approximately the same cross-section as the tread (e.g., to cover the exposed end-grain of the wood of the tread) and the term tread as used herein includes any such decorative trim piece.

The terms "rise" and "rise height" are used interchangeably herein to refer to the distance between the top of one tread to the top of next higher tread in the stairway.

The terms "riser" or "riser board" are used interchangeably herein to refer to the vertical element between each tread in a stairway. In certain instances, a stairway may not provide a riser element leaving an open space between each tread.

The term "nosing" as used herein refers to the portion of the leading edge of the tread that protrudes beyond riser of the step below. Some stairways are constructed such that the leading edge of the tread is flush with the riser and such does not provide a nosing.

The term "starting step" as used herein refers to a step in a stairway that begins at the floor and ends at the first tread.

The term "stringer" as used herein refers to the structural member that supports the treads and risers.

The term "winders" is used in its conventional sense to refer to steps where the depth of the tread is unequal across the width of the tread. Winders are used to change the direction of stairs without landings and, when employed in a series, form circular stairways.

The term "balustrade" as used herein refers to the system of railings and balusters. The inner surface of the balustrade refers to the surface(s) of the balustrade that face the walkline of the stairway, in other words, the typical path of a person walking up or down the stairs in normal use. The outer surface of the balustrade refers to surface(s) of the elements of the balustrade opposite to the inner surface of the balustrade, i.e. that face away from the portion of the stairway that is typically walked on in normal use.

The term "baluster" as used herein refers to a vertical element of the balustrade that extends upward from the tread and supports the handrail. By convention when two or more balusters are used with respect to a single tread, the first baluster is the one closer to the edge of the tread. Additional balusters on the same tread are referred to as the "second baluster", "third baluster" and so forth. Typically, the second or additional balusters on a given step are taller than the first baluster given the angled nature of the handrail. However, some stairways provide a "baserail" or "shoerail" that is presented at an angle substantially the same as the handrail. When a baserail or shoerail is present, the lower end of the balusters terminate at this structure. The present invention is useful when a baserail or shoerail is employed as it prevents the insertion of a foot into the triangular shaped area formed by the baserail, riser and tread.

The term "Open Tread End Protrusion" or "OTEP" when used herein refers to the portion of the tread extending from the outer surface of the balusters to the open end of the tread. In connection with straight stairs, the horizontal dimensions of the OTEP is measured from the outer surface of the balusters to the open end of the tread. On curved stairs, the horizontal dimension of the OTEP is the perpendicular distance between the midpoint of a line drawn between the centerline of the first and second baluster on a given tread and the open end of the tread. In either situation, the exposed tread of the open stair may extend in the direction of the stairway beyond the riser providing to a protrusion beyond the riser and outside of the external stringer and the term OTEP includes this exposed portion as well.

Guard:

The present invention provides a guard that is adapted for mounting over the open end of the tread of a step of an open stairway such that when the guard is associated with the stairway, the guard substantially reduces the exposed flat surface of the OTEP from the outside of the stairway. In one embodiment, the lower portion of the guard is in contact with the outer edge of one or more treads and the upper portion of the guard contacts at least one baluster. By the term "substantially reduces the exposed surface of the OTEP", it is understood that, when the guard is mounted in position, the exposed surface area of the OTEP available from the outside of the stairway is reduced by about 50% or more, 70% or more, 80% or more, 90% or more, 95% or more, or 100%. The upper edge of the guard may extend vertically to the handrail.

In general, it is desirable to have the external surface of the guard be as vertical as practicable to minimize traction on the guard surface. In a single stair configuration, the angle of the external surface of the guard relative to the plane of the tread is generally configured to be is generally greater than about 30 degrees, optionally greater than about 40 degrees, optionally greater than about 45 degrees, optionally greater than about 50 degrees, optionally greater than about 55 degrees, or optionally greater than about 60 degrees from the plane of the tread. The greater such angle, the steeper the exterior surface of the guard. The steeper the exterior surface of the guard, the lower the traction potential on the external surface of the guard. When the guard is configured to cover multiple OTEPs, the angle of the external surface of the guard is measured with respect to the plane defined by the leading edges of the steps, the angle of the external surface being generally configured to be is generally greater than about 30 degrees, optionally greater than about 40 degrees, optionally greater than about 45 degrees, optionally greater than about 50 degrees, optionally greater than about 55 degrees, or optionally greater than about 60 degrees from the plane defined by the leading edges of the steps. When the external surface of the guard is curved, the angle referred to is the angle of a chord defined by the extents of the curved portion of the guard. The lower edge of the guard may terminate at the surface of the tread at a point at or near the external edge of the tread or may extend downward beyond the upper edge of the tread.

The guard may be of generally any cross section that effectively covers the flat area of the OTEP and reduces the exposed area of the OTEP. The surface may be flat, concave, convex, or a combination thereof. In general, the outer surface of the guard should be formed so as to minimize the creation of a horizontal surface that could be used as a step, especially considering the size of feet of a child.

As a matter of convention when describing the present invention, the "outer" surface of the guard is the surface that is exposed and faces away from the elements of the stairway. Conversely, the "inner" surface of the guard is the surface that faces toward the elements of the stairway. The "upper" portion or edge of the guard being the portion that is in the upper position and generally in contact with the balustrade when the guard is fitted into position on the OTEP of a stair. Conversely, the "lower" portion or lower edge is the portion of the guard being in the lower position (and generally in contact with the tread) when the guard is fitted into position on the OTEP of a stair.

In one embodiment of the invention, the guard is configured to limit access to the OTEP region of a single tread. In an alternative embodiment of the invention, a guard is configured to limit access to the OTEP region of multiple steps in a stairway.

One embodiment of the guard (100) of the present invention is illustrated in FIG. 1 of the attached drawings showing the guard (100) in association with an open stairway (101) in a manner contemplated by the present invention such that the exposed surface of the OTEP is substantially reduced. The stairway (101) comprises at least one step, each step comprising a tread (102), a riser (103), and one or more balusters (104).

It will be understood by the skilled artisan that the present invention may be readily adapted to a variety of stairway configurations. However, given that current design and conventionally accepted dimensions for the construction of stairways are well established, a single design may be provided that is useful in a variety of situations. Industry standard guidelines for the construction of stairways are published by the Stairway Manufacturer's Association (657 Quarry Street, Fall River, Mass. USA, www.stairways.org). Additionally the International Code Council ("ICC") publishes standards for the construction of stairways embodied in documents such as the "2009 *International Residential Code for One-and Two-Family Dwellings* and 2009 *International Building Code*, (International Code Council, Inc., Washington, D.C., www.iccsafe.org). The following are generally accepted design criteria for the construction of residential stairways:

(a) in the event that a shoerail or baserail is used to anchor the lower portion of the balusters, the triangular area formed by the riser, the tread and the bottom of the shoerail or baserail will not permit the passage of a 6" (15.2 cm) sphere;

(b) the conventional minimum tread depth (excluding nosing) is 9 inches for private residences;

(c) the conventional maximum acceptable nosing protrusion is 1.25 inches (32 mm) to prevent tripping;

(d) the conventional height of the handrail measured from the nose of the tread is between 34 and 38 inches (864 and 965 mm); and (e) the conventional minimum height of the handrail for landings is typically 36 inches (914 mm).

These conventionally accepted design criteria will assist the skilled artisan in the design of guard systems of the present invention.

The inner surface of the guard may provide one or more structures that inhibit the motion of the guard once mounted in place on the stairway. For example, the lower portion of the guard may also provide a structure on its internal surface that contacts the upper surface of the tread and inhibits downward movement of the guard relative to the tread in the event that downward force is applied to the guard once mounted in place. Such a structure inhibits dislodging of the guard and the consequent exposure of the OTEP when downward force is applied to the guard. Similarly, the guard may also provide a structure on its internal surface that contacts the lower surface of the tread inhibiting upward movement of the guard relative to the tread in the event that an upward force is applied to the guard. Such a structure inhibits dislodging the guard and consequent exposure of the OTEP when upward force is applied to guard.

The guard may also provide a curved or V-shaped structure on its internal surface that interacts with the end of the tread inhibiting both the upward movement of the guard relative to the tread (in the event that an upward force is applied to the guard) and inhibiting movement of the guard relative to the tread (in the event that a downward force is applied to the guard). Such curved or V-shaped structure inhibits movement the guard and consequent exposure of the OTEP when upward or downward force is applied to guard.

The guard may also be formed so as to provide a groove that extends above and below the centerline of the tread when the guard is associated with the stairway effectively "gripping" the end of the tread and preventing the guard from being pushed up or pulled down and exposing the OTEP.

The upper surface of the guard may also incorporate structural features that are commonly employed to discourage contact with human skin such as a pointed structures. Since present invention is used to deter children climbing the outside of stairways, such structural features should be incorporated in a manner so as to discourage a child from stepping on the upper edge of the guard but without inflicting any bodily injury.

Figure 8:
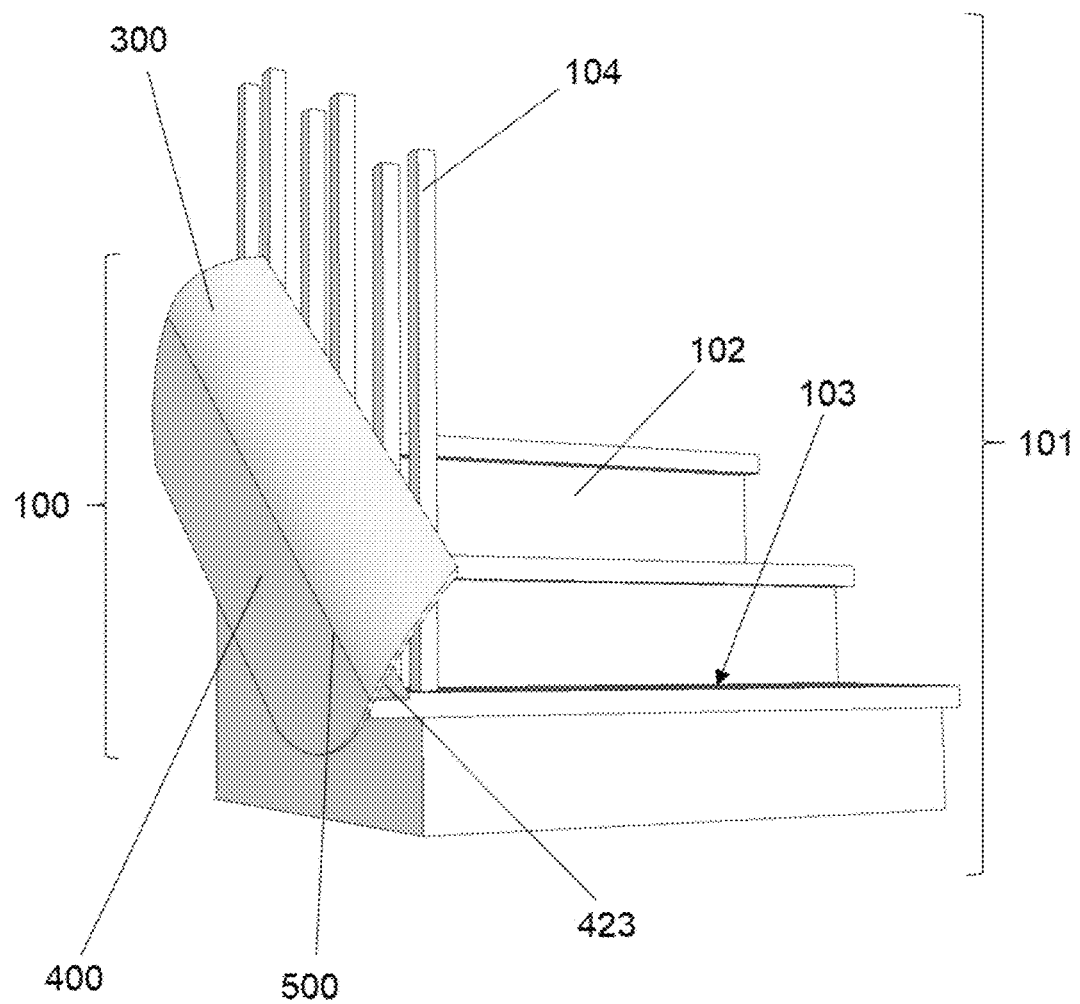
FIG. 8 provides an external view of one embodiment of the invention where the guard is associated with multiple steps of a stairway, said guard having an upper portion attached via a hinge to a lower portion.

In one embodiment of the invention, a plurality of guards of the present invention will be affixed to the lower steps of a stairway. In an alternative embodiment, as illustrated in FIG. 8 of the accompanying drawings, a single guard may be affixed over a plurality of stair ends limiting the access to the OTEP regions of multiple stairs with a single guard. The number of guards to be installed will be apparent to the skilled artisan based on factors such as the size of the individual to be deterred and the rise of each step.

In some instances, the at least a portion of the open stairway is curved. Such curved stairways comprise one or more winders and are generally associated with a curved balustrade. As previously described, the apparatus of the present invention may be used with curved stairways either through the use of multiple guards or through the use of flexible guards that enable the guard to conform to curved stairways. The guard may be constructed to provide flexibility along its length or flexibility can be achieved through the incorporation of flexible regions in the guard.

In one embodiment, the selection of the guard material and its dimensions may be adapted to provide flexibility, particularly along its longitudinal axis, to facilitate conformation to curved stairways and the curved balustrades generally associated with curved stairways. Enhanced flexibility of the guard material may be achieved through the use of flexible materials for construction of the guard. Enhanced flexibility may be achieved in more rigid materials by incorporating structural features such as grooves, furrows, kerfs or corrugations in the material to facilitate bending. In general, such grooves, furrows, kerfs or corrugations are incorporated in the material substantially perpendicular to the desired direction of the curvature of the material. In one embodiment, the entire guard may be formed of such corrugated cross section, the corrugations generally extending from the top edge to the bottom edge of the guard.

Guards having enhanced flexibility for use with curved stairways may be formed by constructing the guard with regions of greater and lesser flexibility. Such flexible and non-flexible zones may be achieved by constructing a guard of a single material which is formed to provide regions of enhanced flexibility as previously described by varying the thickness of the material, or incorporating structural features such as grooves, furrows, kerfs or corrugations in the material to enhance flexibility. In one embodiment, flexibility of the guard may be achieved and/or enhanced by the incorporation of one or more regions having a corrugated cross section, the corrugations generally extending from the top edge of the guard to the bottom edge of the guard. The term corrugated, is used in its conventional sense to refer to a material having alternating ridges and furrows. In another embodiment, the guard is configured to incorporate one or more corrugated and/or non-corrugated zones. The particular conformations of such corrugations would be readily understood by the skilled artisan taking into consideration the guard material, the thickness of the guard material, the dimensions of the guard, the degree of flexibility desired, and other structural considerations apparent to one of skill in the art.

Alternatively, guards for use with curved stairways may be constructed through a combination of materials having greater and lesser flexibility joined together in a segmented fashion. For example one or more segments of the guard may be constructed of a flexible material (e.g., vinyl or rubber) with one or more other segments of the guard constructed of a stiffer material (e.g., polycarbonate, ABS, etc.). The selection of materials and their dimensions to achieve regions of greater and lesser flexibility would be apparent to one of skill in the art.

Figure 15:
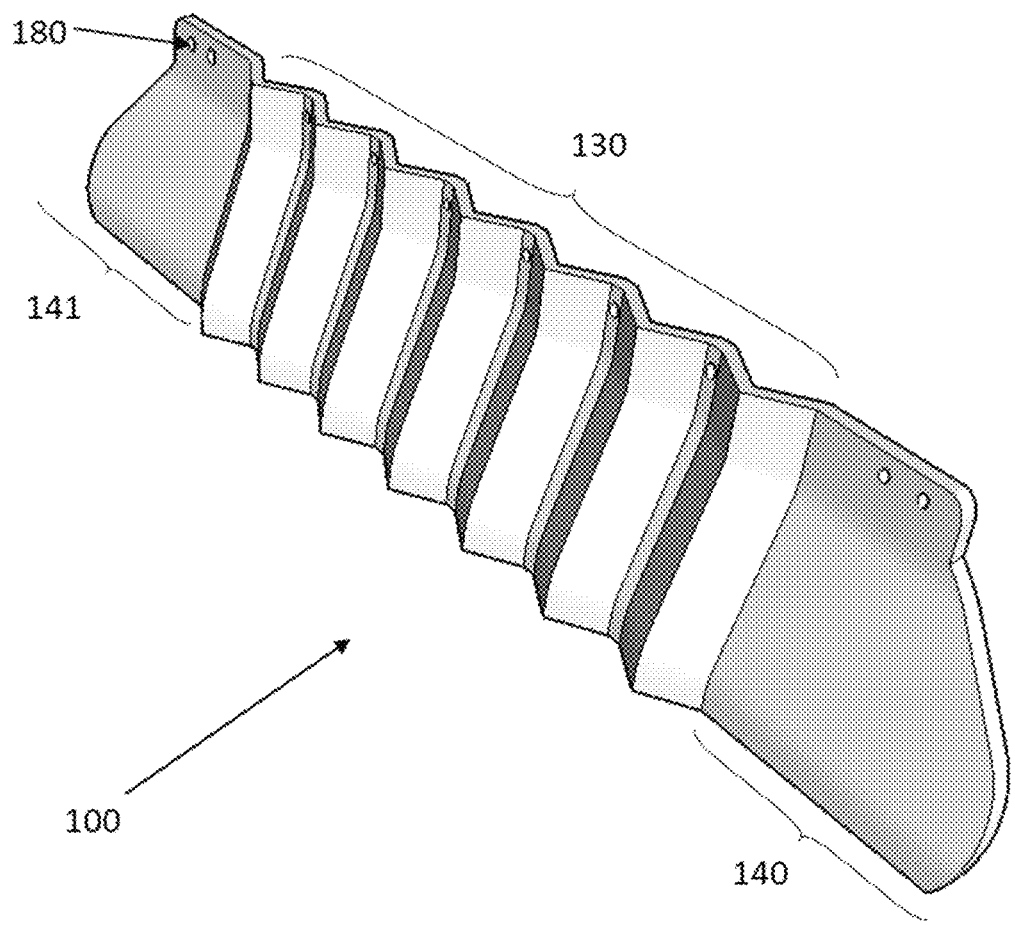
FIG. 15 provides an upper perspective view of a guard with a plurality fastener apertures near its upper edge to facilitate attachment to the balustrade of the stairway, said guard incorporating a corrugated central region extending from the top edge to the bottom edge of the guard flanked at either end by the terminal regions of the guard of lesser flexibility.

One embodiment of a guard providing enhanced flexibility useful in association with curved stairways is a guard formed of a single material having a central corrugated region as illustrated in FIG. 15 of the attached drawings. FIG. 15 provides an upper perspective view of a guard (100), said guard providing a plurality of fastener apertures (180) along its upper edge to facilitate mounting to the balustrade of the stairway, incorporating a corrugated central region (130) extending from the top edge to the bottom edge of the guard, said corrugated central region (130) flanked at either end by the terminal regions of the guard (140 and 141) of lesser flexibility. The incorporation of the accordion-like corrugated central region of the guard provides enhanced flexibility along the longitudinal axis of the guard to facilitate close association with curved stairways while the more rigid end regions resist deformation and facilitate shielding of the OTEP of the lowest step from stairway from access and typically enhances stable association between the guard and the stairway. As illustrated, the guard is typically substantially symmetrical about its transverse centerline to facilitate adaptation of a single design to the stairways where either or both sides of the stairway are open thereby avoiding the necessity to produce a "left-handed" and "right-handed" guard design for each situation.

Figure 16:
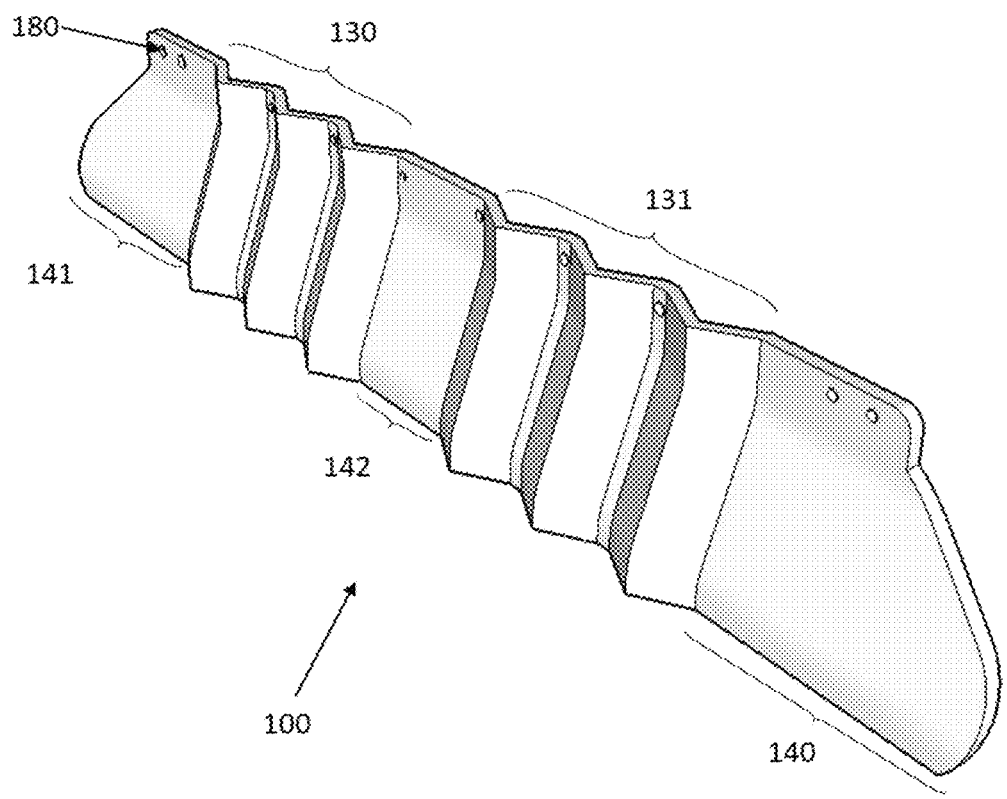
FIG. 16 provides an upper perspective view of a guard with a plurality fastener apertures near its upper edge to facilitate attachment to the balustrade of the stairway, said guard incorporating a substantially rigid central region flanked by corrugated zones and terminal regions of the guard of lesser flexibility.

Similarly, another embodiment of a guard formed of a single material providing enhanced flexibility incorporating multiple corrugated segments interposed with more rigid sections is provided in FIG. 16 of the attached drawings. In reference to FIG. 16, the guard (100), which provides a plurality of fastener apertures (180) along its upper edge to facilitate mounting to the balustrade of the stairway, incorporates a substantially rigid central region (142) flanked by corrugated zones (130 and 131) and terminal regions of the guard (140 and 141) of lesser flexibility. Each accordion-like corrugated segment (140 and/or 141) of the guard provides enhanced flexibility of the guard along the longitudinal axis of the guard to facilitate close association with curved stairways.

Retention Means:

The invention further provides for a retention means to facilitate stable association of the elements of the apparatus including the guard, drape, and/or handrail guard with the stairway. A variety of mounting systems may be employed to provide stable association of one or more elements of the apparatus with the stairway. Means for stable association include conventional retention means such as adhesives, screws or nails. However, this apparatus is designed for facile removable association with the stairway and minimizes damage to the components of the stairway.

One embodiment of a removable mounting system employs cable ties. Cable ties are provided in a variety of configurations. The most common configuration of a cable tie employs a nylon tape with a gear rack and an interlocking ratchet mechanism, the ratchet mechanism interacting with the gear rack in a unidirectional fashion to provide a locking effect. Alternative embodiments of cable ties useful in the practice of the present invention include cable ties employing a hook-and-loop (e.g. Velcro) securing system. Cable ties, both single use and removable, are commercially available in a wide variety of configurations from many suppliers such as U-Line, 12575 U-Line Drive, Pleasant Prairie, Wis. 53158. When employing a cable tie retention system, the guard may be provided with one or more holes or perforated tabs on its interior face to facilitate attachment of the cable tie to the guard. The cable tie(s) may be then passed through the perforations in the guard (either through the guard itself or a perforated tab(s) extending from the interior face of the guard). Similarly, any of a variety of elastic materials such as springs, elastic cording, bungee cords, shock cord, or other elastic materials may be employed to facilitate stable association of the guard with the balustrade of the stairway.

Figure 2:
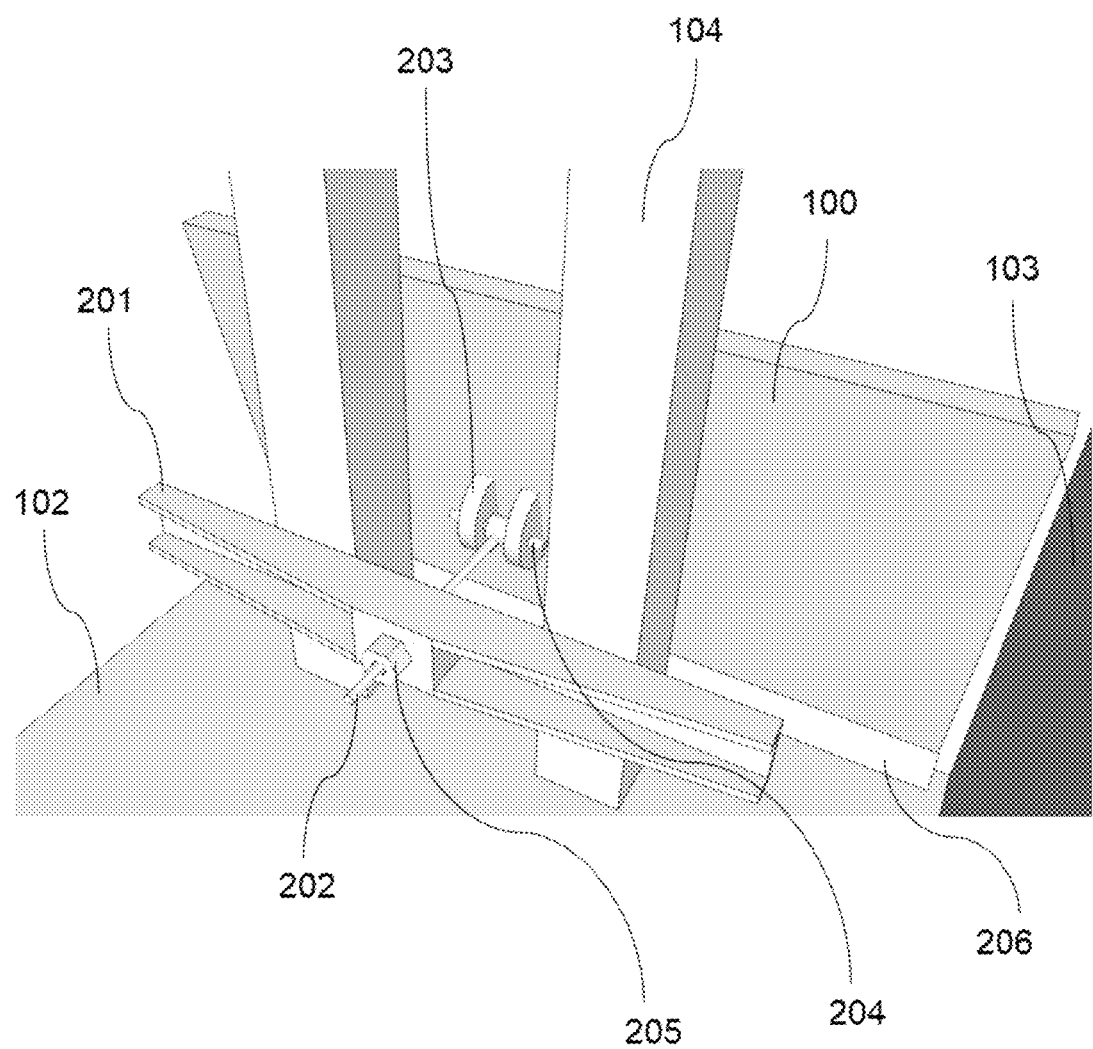
FIG. 2 provides a perspective view of a guard in association with a step of a typical open stairway in a manner contemplated by the present invention.

In one embodiment of the invention, stable association of the guard with the stairway may be achieved by a fastener extending perpendicularly from the interior surface of the guard to an elongated spreader bar, said spreader bar spanning the distance between two or more balusters as illustrated in FIG. 2 of the attached drawings. In such configuration, the fastener may be a conventional threaded fastener such as a threaded rod, bolt, or screw, such that the spreader bar is secured against the balusters using a corresponding threaded nut or equivalent. To prevent children from accessing the retention means and removing the guard system, it is preferable that the fastener (generally a nut) is recessed into the body of the spreader bar to inhibit loosening of the fastener without appropriate tools. The dimensions of the spreader bar are not confined to any particular dimension but will be defined by the particular stairway to which the apparatus is to be affixed. However, some general dimensional considerations are provided by the ICC standards for the construction of stairways that may be considered. The ICC specifies that the distance between adjacent balusters may not be so great as to permit the passage of a 4" (10.2 cm) diameter sphere between the adjacent balusters. Additionally, the ICC provides that the minimum tread depth for residences is 9" with a maximum of 1.5 inch (32 mm) nosing protrusion. Consequently the spreader bar when employed with respect to a guard fitted on an individual stair will generally be greater than about 4 inches (102 mm), typically approximately about 6 inches (156 mm) but less than about 8 inches (204 mm). In those situations where the guard is configured to cover the OTEP regions of multiple stairs (FIG. 8) the spreader bar may be elongated commensurate with the dimensions of the multi-step guard and provide for multiple attachment points for fasteners (see, e.g. FIG. 7). The dimensions of the guard assembly may be readily customized by the skilled artisan to secure the guard in particular applications that are not constructed in adherence to conventional building standards. When attaching the guard to a curved stairway using the spreader bar system, the spreader bars may also be configured to provide enhanced flexibility to conform to the balustrade through the use of flexible materials or construction incorporating structural features to provide enhanced flexibility of the spreader bar.

FIG. 2 is an illustration of one embodiment of the invention and illustrates the guard (100) with a retention means to maintain stable association between the guard (100) and the balusters (104) wherein the retention means comprises a spreader bar (201) positioned transversely across the balusters (104), a fastener (202) that is pivotally attached to the inner surface of the guard, the guard providing two protrusions (203) receiving a pivot pin (204), and a nut (205) to maintain tension in the fastener (202) and hold the spreader bar (201) in place. The embodiment illustrated in this FIG. 2 also illustrates the presence of a structural element (206) protruding from the inner surface of the guard (100) that provides resistance to downward movement of the guard (100) when a downward force is applied.

In an alternative embodiment where a spreader bar is employed, in an alternative to using a threaded fastener between the guard and the spreader bar, one or more elastic members may be employed to maintain tension between the guard and the spreader bar to retain the guard in position on the stairway. The elastic member may be comprised of any elastic material including but not limited to rubber bands, elastic cording, bungee cords, springs, and elastic webbing.

In order to facilitate the adaptability of the guard to stair configurations with different OTEP dimensions, particularly those having varying distances between the balusters and the end of the tread, the fastener may be pivotally attached to the inner surface of the guard such that the fastener may be positioned substantially parallel to the tread and perpendicular to the baluster(s) and spreader bar. The pivotal attachment of the fastener to the guard may be achieved through conventional means. In one embodiment, the guard provides one or more protrusion from its interior surface to facilitate retention of a pivot pin, the fastener possessing a hole through which the pivot pin may pass such that the fastener is pivotally attached to the interior surface of the guard, the threaded fastener (e.g. an eye-bolt) having an aperture at one end such that the pivot pin may pass through.

Figure 3:
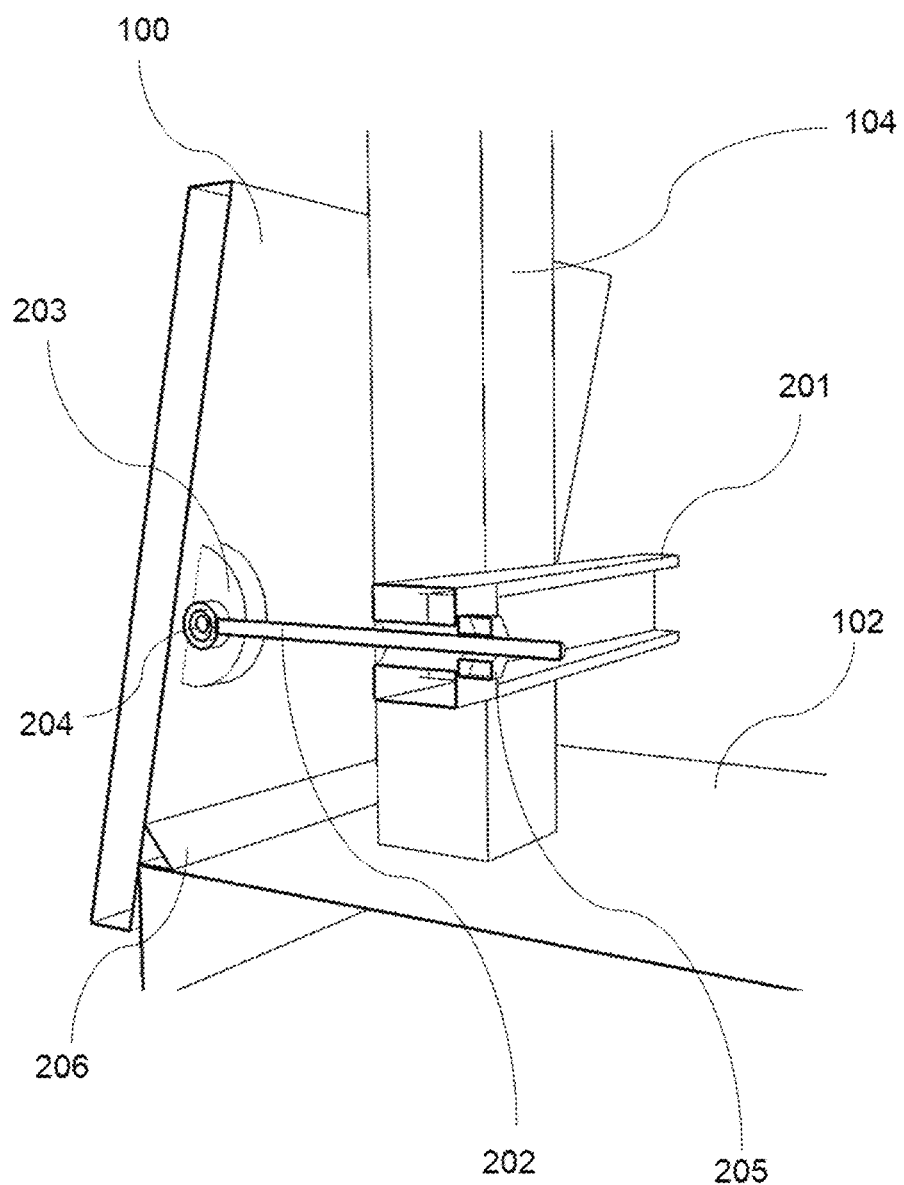
FIG. 3 provides a cross sectional view of one embodiment of the invention where the guard is configured as a flat planar surface with a fastener pivotally attached to the inner surface of the guard retained by a spreader bar and nut.

One embodiment of such a configuration is illustrated in FIG. 3 of the attached drawings which provides a cross-sectional view of the guard (100) in association with the stairway where the guard (100) of the present invention is configured as a flat planar surface with a retention means to maintain stable association between the guard (100) and the stairway (100) wherein the retention means comprises a spreader bar (201) positioned transversely across the balusters (104), a threaded fastener (202) that is pivotally attached to the inner surface of the guard through the use of protrusions (203) and a pivot pin (204) passing through said protrusions (203) and an aperture in one end of the threaded fastener (202), and a nut (205) to maintain tension in the fastener, a structural element (206) protruding from the inner surface of the guard provides resistance to downward movement of the guard (100) when a downward force is applied.

Figure 4:
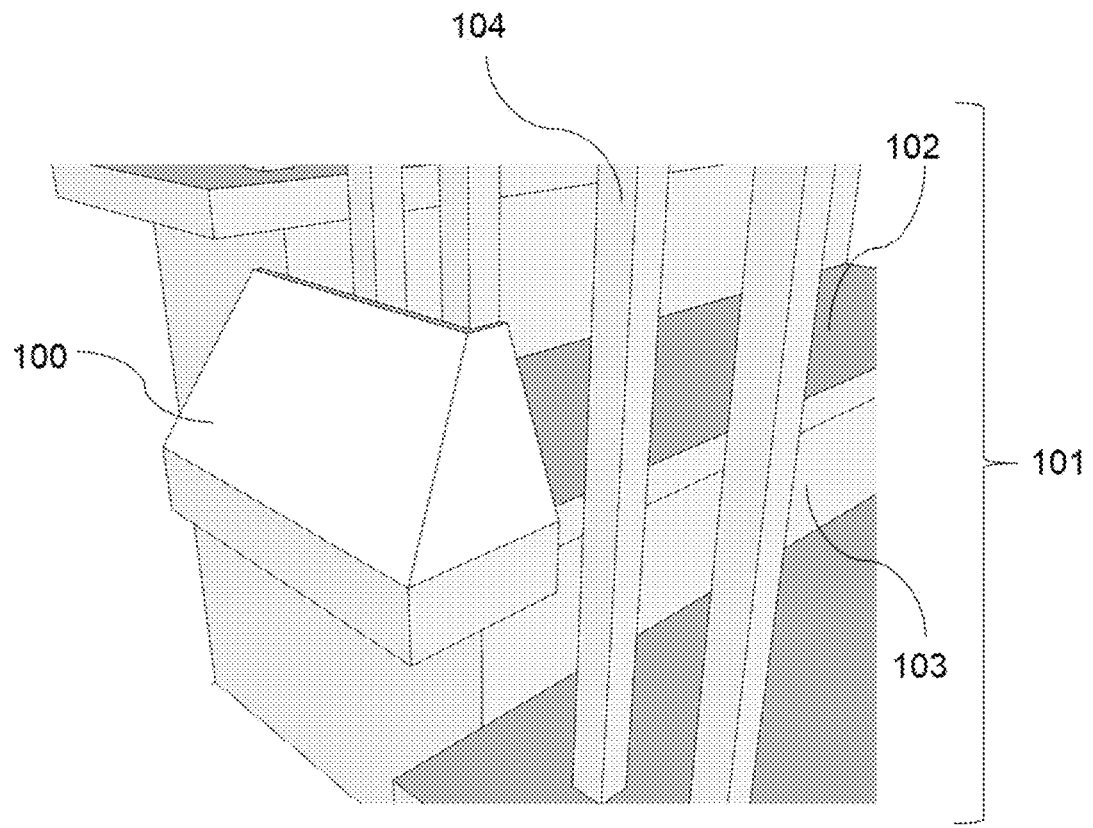
FIG. 4 provides an illustration of one embodiment of the invention wherein the guard wraps around the leading edge of the tread.

In one embodiment, the guard extends over the open end of the tread and around the front corner of the tread and covers a portion of the exposed leading edge of the tread from the exposed end of the tread to the first baluster such that the cross-section of the guard in contact with the tread forms an "L" shape when viewed from above. An example of such a configuration of such is provided in FIG. 4 of the attached drawings wherein the guard (100) is illustrated in association with a stairway (101), comprising a tread (102), a riser (103) and baluster (104), wherein guard (100) is designed to wrap around the open end of the tread (102) that protrudes beyond the baluster (104) thereby minimizing the exposed OTEP.

Figure 5:
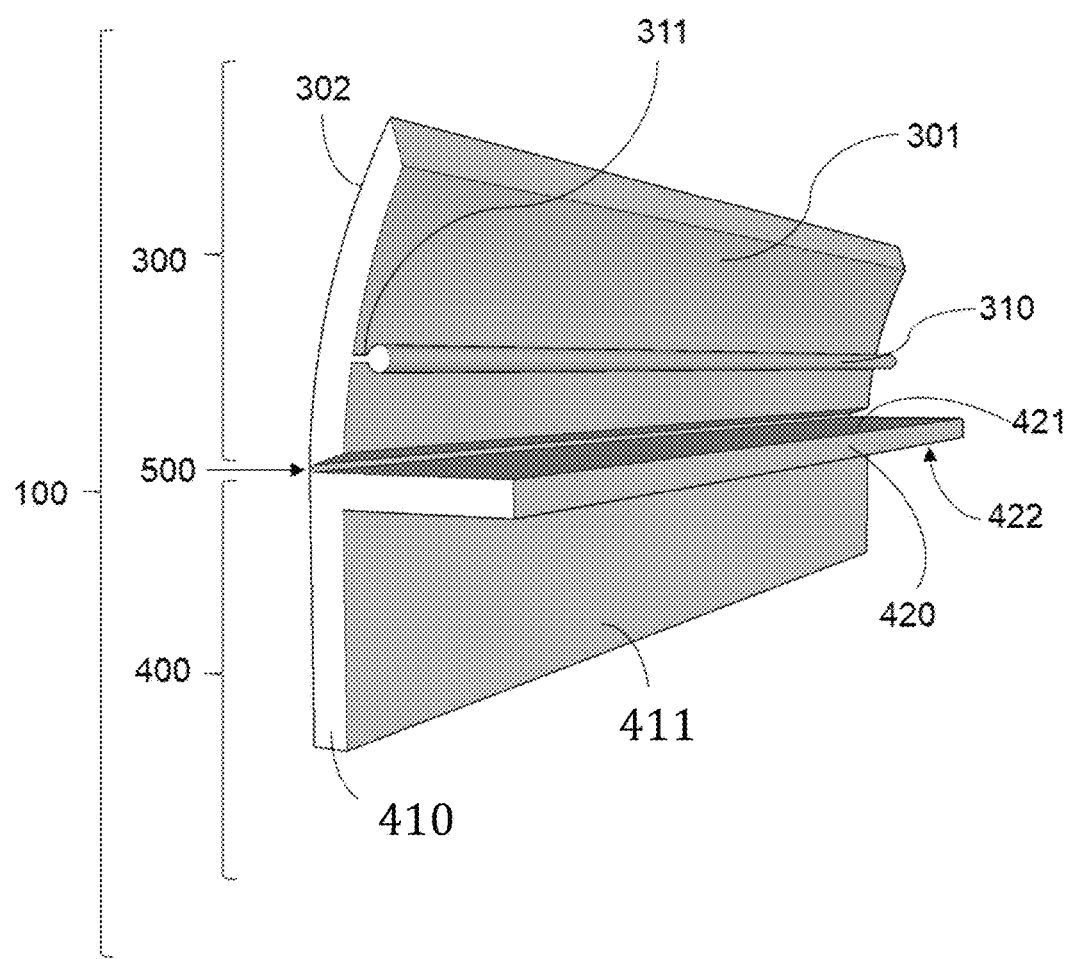
FIG. 5 provides a perspective view of the inner surface of one embodiment of a guard of the present invention wherein the guard comprises an upper portion and a lower portion associated by a hinge.

In one embodiment of the invention, the guard may be formed of an upper and lower portion being hingedly attached. In such an embodiment of the invention as illustrated in FIG. 5 of the accompanying drawings, the guard (100) is elongated having an upper portion (300) that is associated via a hinge (500) with a lower portion (400). The lower portion of the guard possesses a downward element (410) and a transverse element (420). In general, the inner surface (411) of the downward element (410) and the under surface (422) of the transverse element (420) are disposed at approximately a right angle. When fitted to a stairway, the inner surface of the lower portion (411) is in contact with the outer edge of the tread and the lower surface of the transverse portion (422) is in contact with the upper leading edge of the tread. The upper surface (421) of the transverse element (420) is generally exposed.

In one embodiment, as illustrated in FIG. 5, the hinge (500) is a "living" hinge, extending longitudinally defining an axis of rotation of the upper portion of the guard (300) relative to the lower portion of the guard (400). The living hinge may be formed integrally with the upper and lower portion of the guard. Such a configuration facilitates the production of the guard by conventional extruding techniques enabling the facile production of guards of any desired length. As will be appreciated by the skilled artisan, the upper portion of the guard (300) and the lower portion of the guard (400) may be formed of separate pieces which are movably attached by conventional hinge mechanisms including piano hinges (also referred to as continuous hinges), living hinges, strap hinges, barrel hinges, fabric hinges, and the like. The hinge components may be provided as separate elements attached to the upper portion of the guard (300) (said upper portion having an inner surface (301) and an outer surface (302)) and lower portion of the guard (400) or each element of the hinge may formed integral to the upper portion of the guard (300) and lower portion of the guard (400).

Figure 7:
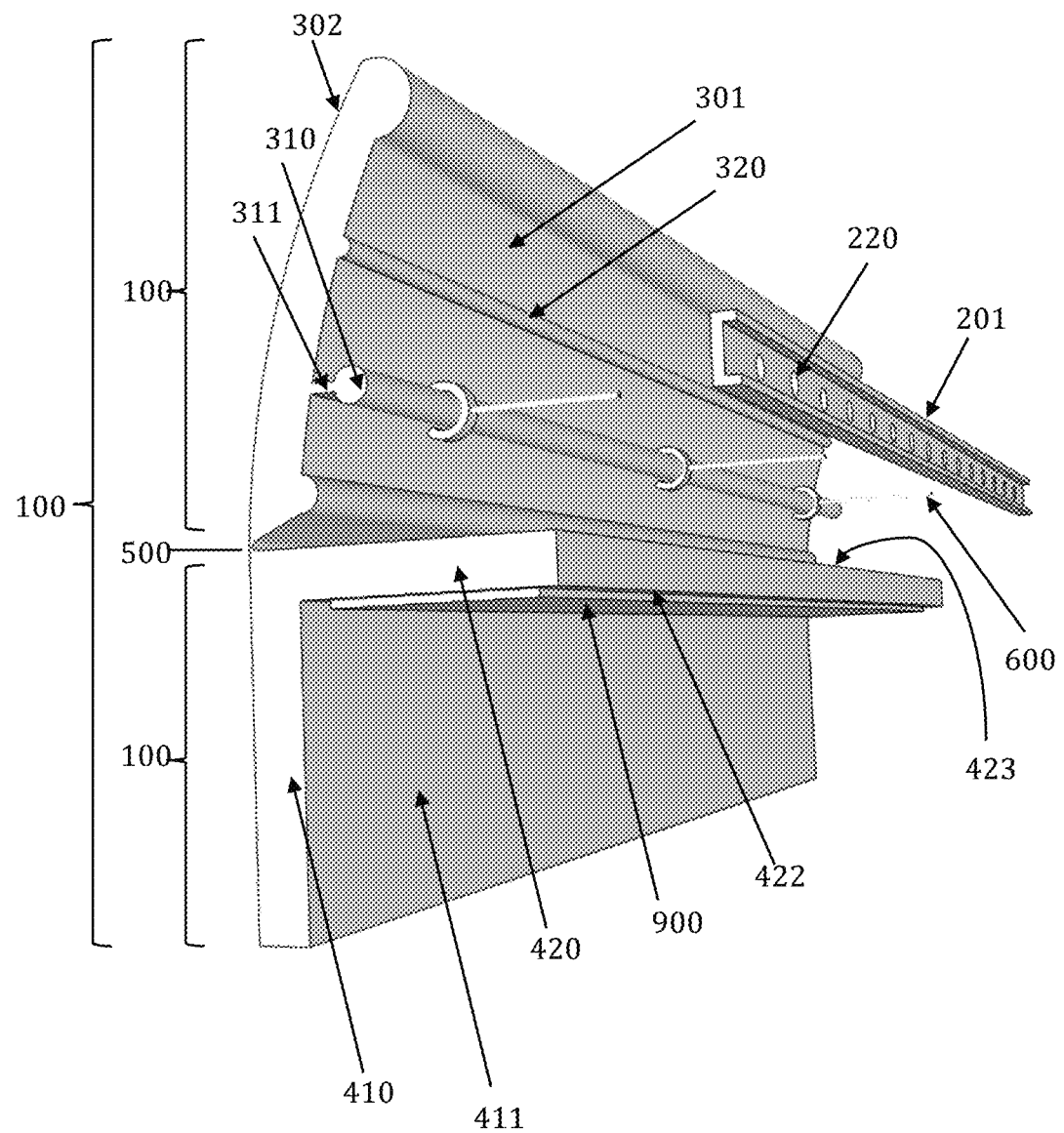
FIG. 7 provides a perspective view of the inner surface of one embodiment of a guard of the present invention and a retention means.

In one embodiment of the invention as illustrated in the FIGS. 5 and 7, the guard (100) provides an extended semi-cylindrical rail element (310) attached to the interior surface (301) by a structure (311). The semi-cylindrical rail element (310) accepts a plurality of track fasteners (600) that slide along semi-cylindrical rail element (310) and but when force is applied normal to the track fastener (600), the semi-cylindrical portion (601) engages the rail (310) and provides stable association of the guard (100) with the stairway.

Figure 6:
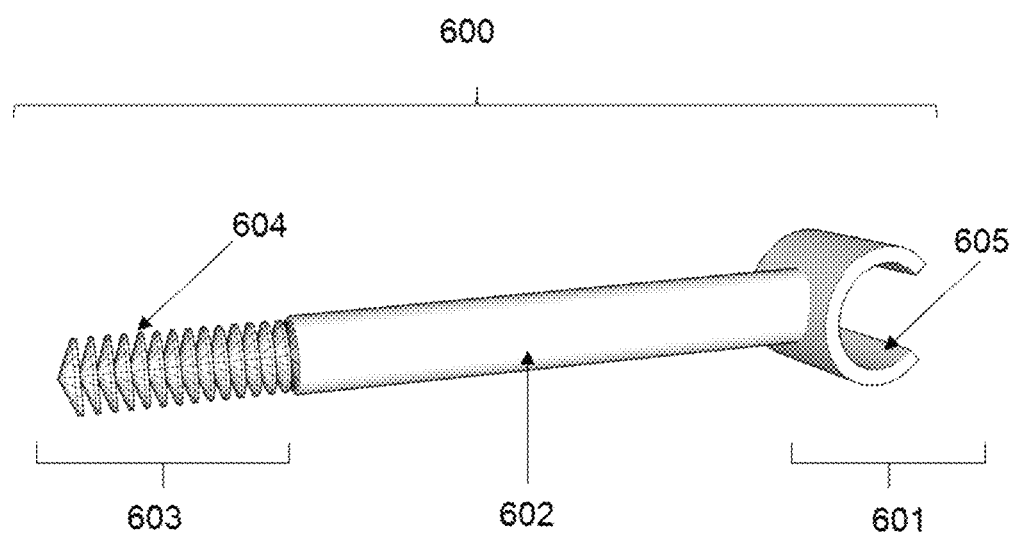
FIG. 6 provides an illustration of one embodiment of the present invention illustrating a retention means employing a fastener with a semi-cylindrical portion to engage a semi-cylindrical track element provided on the inner surface of the guard.

FIG. 6 provides an illustration of a track fastener (600), the track fastener (600) providing a semi-cylindrical structure at one end (601) the inner surface of which (605) is closely fitting over the track (310) such that the fastener (600) and may be positioned at any point along the track (310) to facilitate association with various stairway configurations. In addition, the semi-cylindrical structure (601) enables rotation of the upper portion of the guard (300) while enabling the fastener (600) to be positioned substantially perpendicular to the balustrade. As illustrated in FIG. 6, the fastener (600) comprises a semi-cylindrical structure (601) and extended shank portion (602) and an insert fastener (603). The insert fasteners may be a "Christmas tree" or "fir-tree" style fasteners which are referred to as having differing "fin" types being a standard "X" type fins, ratcheting "R" type fins or "P type fins. Such fasteners are generally directionally biased and formed from nylon such that the fins deform with comparatively little effort when inserted into a suitable sized opening but are biased to require substantially greater effort to remove in the opposite direction. \

As illustrated in FIG. 7, track fastener (600), the details of which are shown in FIG. 6 but not in FIG. 7, when placed in association with the guard (100) the fastener (600) extends from the track element through the space between the balusters (not illustrated) and associates with a spreader bar (201), said spreader bar (201), here illustrated as having a C-shaped cross section, having a plurality of apertures (220) through which the fir-tree portion (603) extends, the fins (604) of the fir-tree portion (603) of the track fastener (600) engaging the spreader bar (201).

As illustrated in FIG. 7, the outer surface (703) of the spreader bar (201) is placed in contact with the balusters. Applying a drawing force to protruding end (603) of the track fastener (600), the upper portion (300) of the guard (100) rotates about the hinge (500) relative to the lower portion (400) of the guard (100) and is drawn against the outer surface of the balusters and the providing a stable association between the guard (100) and the stairway.

Figure 9:
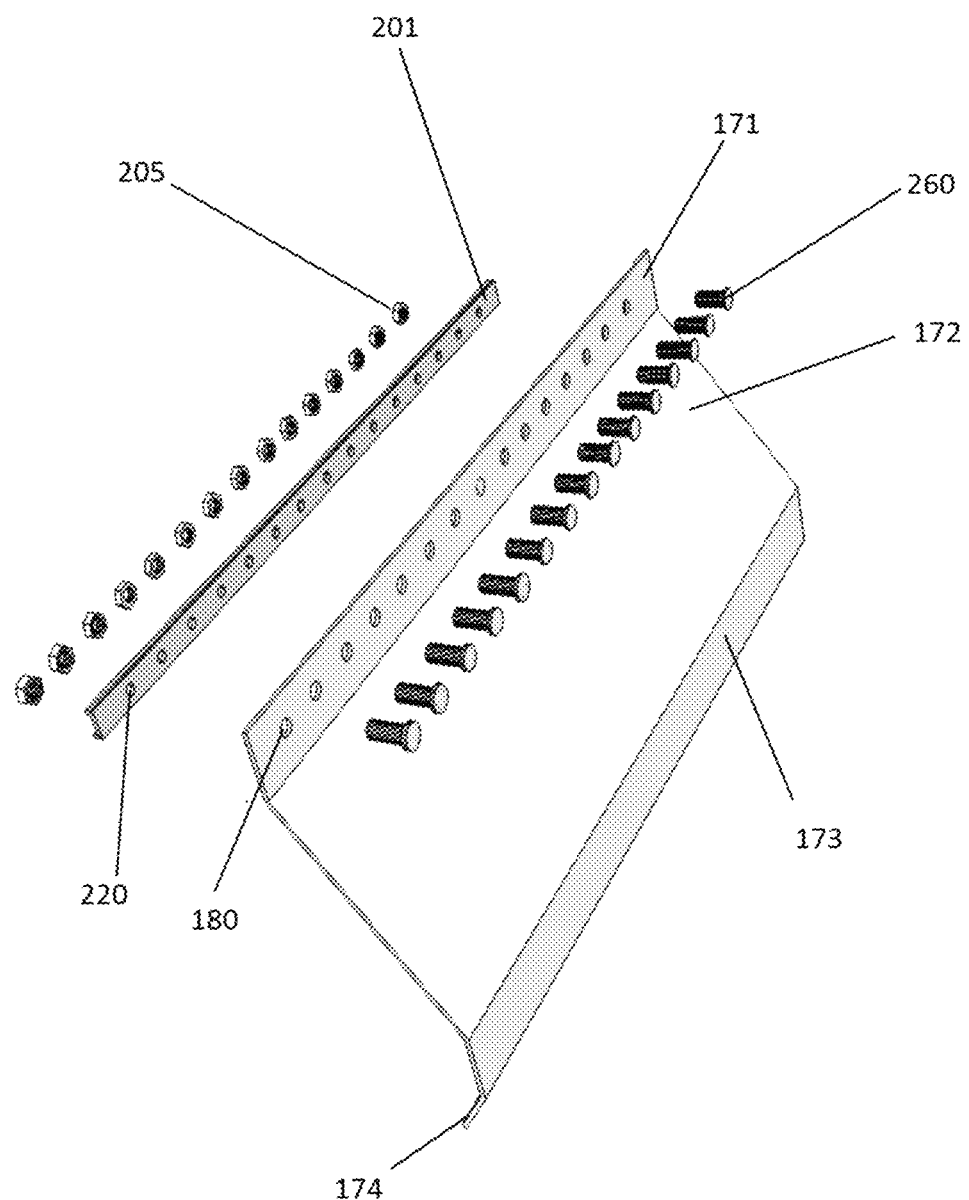
FIG. 9 provides a perspective view of one embodiment of the invention where the guard, in reference to the plane of the balusters, possesses a vertical upper portion, outwardly angled second portion, a substantially vertical third portion and inwardly angled lower portion that covers the OTEP region of multiple steps. The guard is secured to the balustrade through the use of a spreader bar that contacts the inner surface(s) of one or more balusters, with multiple threaded fasteners and nuts, said threaded fasteners passing through corresponding apertures in the guard, the spaces between the balusters and apertures in the spreader bar such that when these fasteners are tightened, the guard is secured to the stairway balustrade.

An alternative embodiment of the guard of the present invention is illustrated in FIG. 9 of the attached drawings. This embodiment provides a guard configured as a multistep guard, said guard having a substantially vertical upper portion (171), an outwardly angled second portion (172), a substantially vertical third portion (173) and inwardly angled lower portion (174). The inwardly angled lower portion (174) is provided to further deny access to OTEP from underneath as well as providing additional structural stiffness to the guard (100). The substantially vertical upper portion (171) provides a plurality of fastener apertures (180). Securing of the guard (100) to the balustrade may be accomplished through a variety of retention means, one of which illustrated in FIG. 9 involves the use of threaded fasteners (260) that pass through the fastener apertures (180) of the guard (100) and through the fastener apertures (220) of spreader bars (201) as well as the spaces between the balusters (not shown), the fastener being secured with a threaded nut (205), the tightening of which results in a compressive force being applied on the guard and spreader bar against the baluster resulting in high static friction between the guard (100) and stairway balustrade (not shown).

Figure 10:
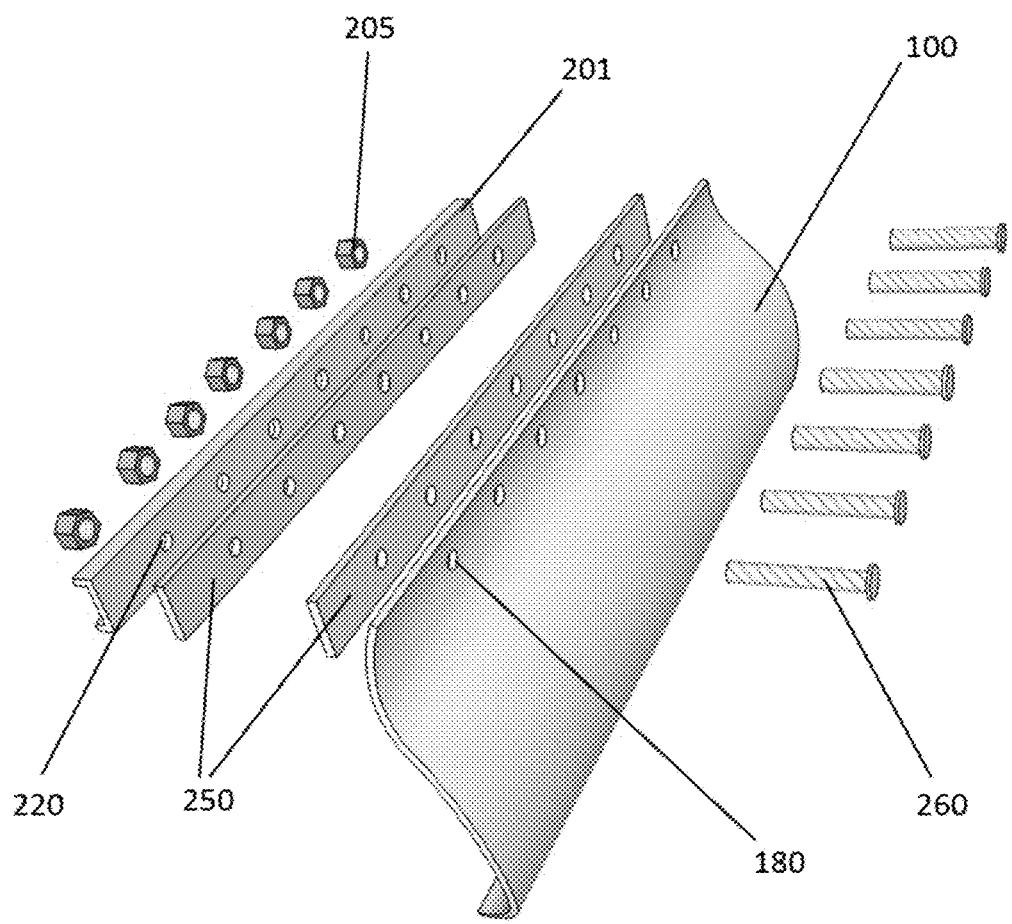
FIG. 10 is a perspective view of one embodiment of the invention where the guard, having convex and concave curved surfaces, is configured to cover the OTEP region of multiple steps and is secured to the balustrade through the use of a spreader bar further comprising an inner and outer gaskets that are inserted between the spreader bar and the upper portion of the guard that contacts the outer surface(s) of one or more balusters. As illustrated, the components are secured in place on the stairway through the use of multiple threaded fasteners and nuts, said threaded fasteners passing through corresponding apertures in the guard, spreader bar, inner and outer gaskets and the spaces between the balusters such that when the fasteners are tightened, the guard, gaskets and spreader bar are secured to the stairway.

An alternative embodiment of the guard of the present invention is illustrated in FIG. 10 of the attached drawings. This embodiment provides a guard (100) configured as a continuously curved surface having an upper concave region and a lower convex region. The upper portion of the guard (100) provides a plurality of fastener apertures (180). The embodiment provided in FIG. 10 further illustrates the use of gaskets (250) between the spreader bar and guard surfaces in contact with the balusters (not shown). Similar to other configurations discussed, securing of the guard (100) to the balustrade (not shown) may be accomplished through a variety of means including the illustrated use of threaded fasteners (260) that pass through the fastener apertures (180) of the guard (100), the space between the balusters (not shown) and through the fastener apertures of a spreader bar (220), the threaded fasteners (260) being secured with a nuts (205), the tightening of which results in a compressive force being applied on the guard (100) and spreader bar (201) against the baluster (not shown) resulting in high static friction between the guard and balustrade.

Optionally, an elastomeric gasket may be employed that is oriented between the surface of the spreader bar and/or guard in contact with the balustrade to enhance the static friction between the spreader bar and/or guard and the balustrade. The elastomeric gasket also provides a cushion between the surface of the spreader bar and/or guard which minimizes potential damage to the balustrade through the fitment of the guard system. The elastomeric gasket will provide apertures corresponding to the arrangement of fastener apertures provided in the spreader bar and the guard.

An illustration of one embodiment of such an elastomeric gasket is provided in FIG. 10 of the attached drawings. FIG. 10 provides a perspective view of an apparatus of the present invention providing two elastomeric gaskets (250), one positioned between an inner spreader bar (201) and the baluster (not shown) and another positioned between and the guard (100) and the balusters (not shown). The elastomeric gasket may be constructed from any of a variety of elastomeric materials including but not limited to rubber, silicone, nitrile, closed cell foams, ethylene-propylene-diene-monomer (EPDM), or other thermoplastic elastomers. In general the elastomeric material will possess a Young's modulus of less than approximately 0.5 GPa, preferably less than about 0.2 GPa, less than about 0.1 GPa.

Drape

Children who climb the outsides of the stairways frequently use the balusters as hand holds to assist climbing. To address this problem, the invention provides an apparatus comprising a guard and vertical drape. The vertical drape extends vertically from the guard and covers a portion of the balusters denying a child from gaining a handhold on the balusters. The vertical drape may be formed of rigid or flexible materials such as fabrics.

Figure 11:
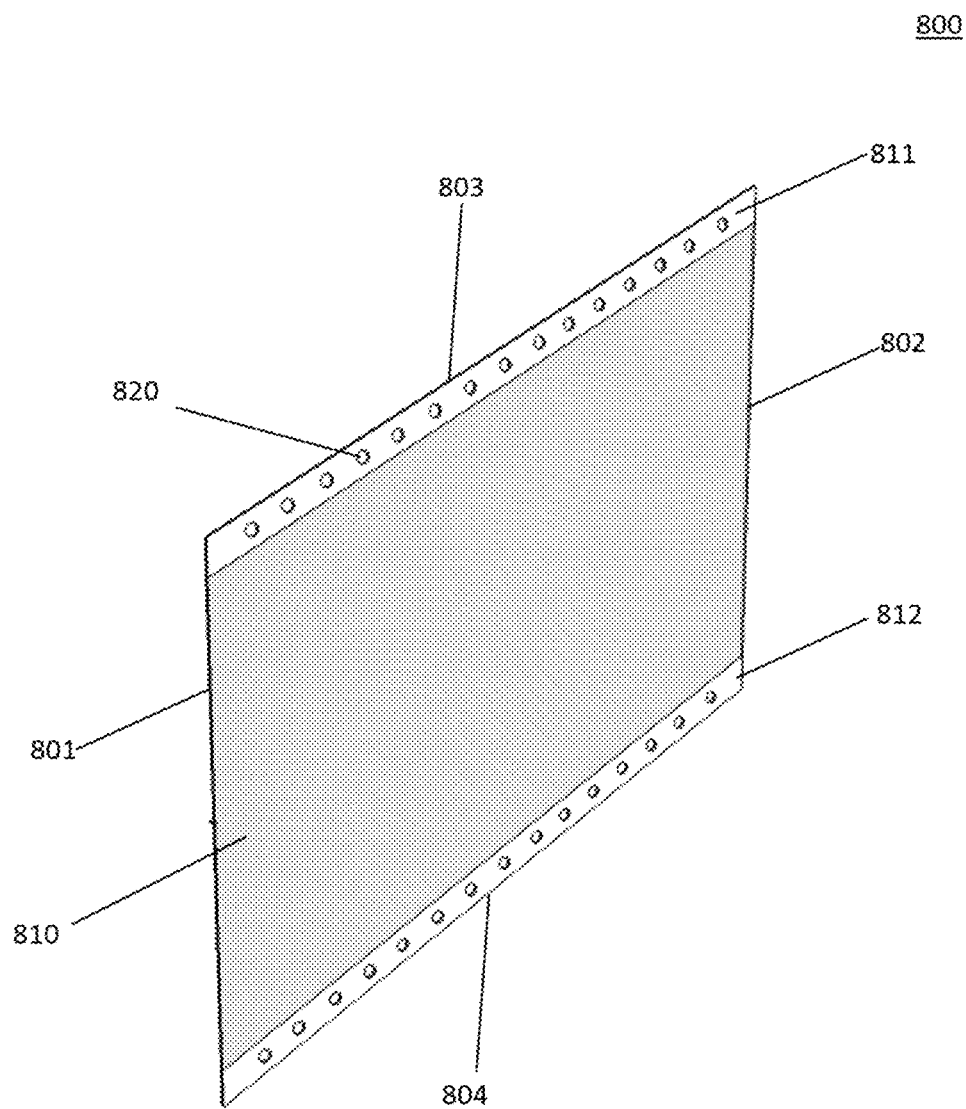
FIG. 11 is a perspective view of the vertical drape.

One embodiment of the drape (800) is illustrated in FIG. 11 of the attached drawings. As illustrated, the drape (800) is a substantially trapezoidal shaped fabric having left (801) and right (802) parallel edges of the trapezoid forming the vertical sides of the trapezoid and upper (803) and lower (804) edges. As illustrated in FIG. 11, the drape (800)

comprises a central panel (810) and reinforced upper (811) and lower (812) edges, each of which provide a plurality of fastener apertures (820).

It is desirable to maintain tautness in the fabric material of the drape to reduce the potential of a child from distorting the material around a baluster and obtaining a grip thereon. The drape (800) is secured at its upper (803) and lower edges (804) to maintain tautness in the material. The drape (800) may be anchored at its lower edge by the same fasteners that secure the guard to the balustrade, said fasteners passing through fastener apertures (820) provided in the drape near the lower edge of the vertical drape. The fastener apertures in the drape may be provided in the drape material itself. Alternatively, due to the stresses on the fabric, the fastener apertures may be provided in a reinforced fabric panel and/or may employ grommets to minimize damage to the fabric itself. The orientation of the fastener apertures (820) is generally provided to match the fastener apertures of the guard (not shown) and spreader bar (not shown) if so employed.

In an alternative embodiment, the upper portion of the vertical drape may be secured to the balustrade by a variety of means. For example, the vertical drape may be secured near (or against) the lower surface of the handrail by multiple ties or straps that extend around the handrail and are tied or fastened together. In one embodiment, the upper edge of the vertical drape is secured to the handrail by straps employing hook-and-loop fasteners. The ties or straps may be secured to the surface of the drape or may pass through apertures provided near the upper edge of the vertical drape.

Figure 12:
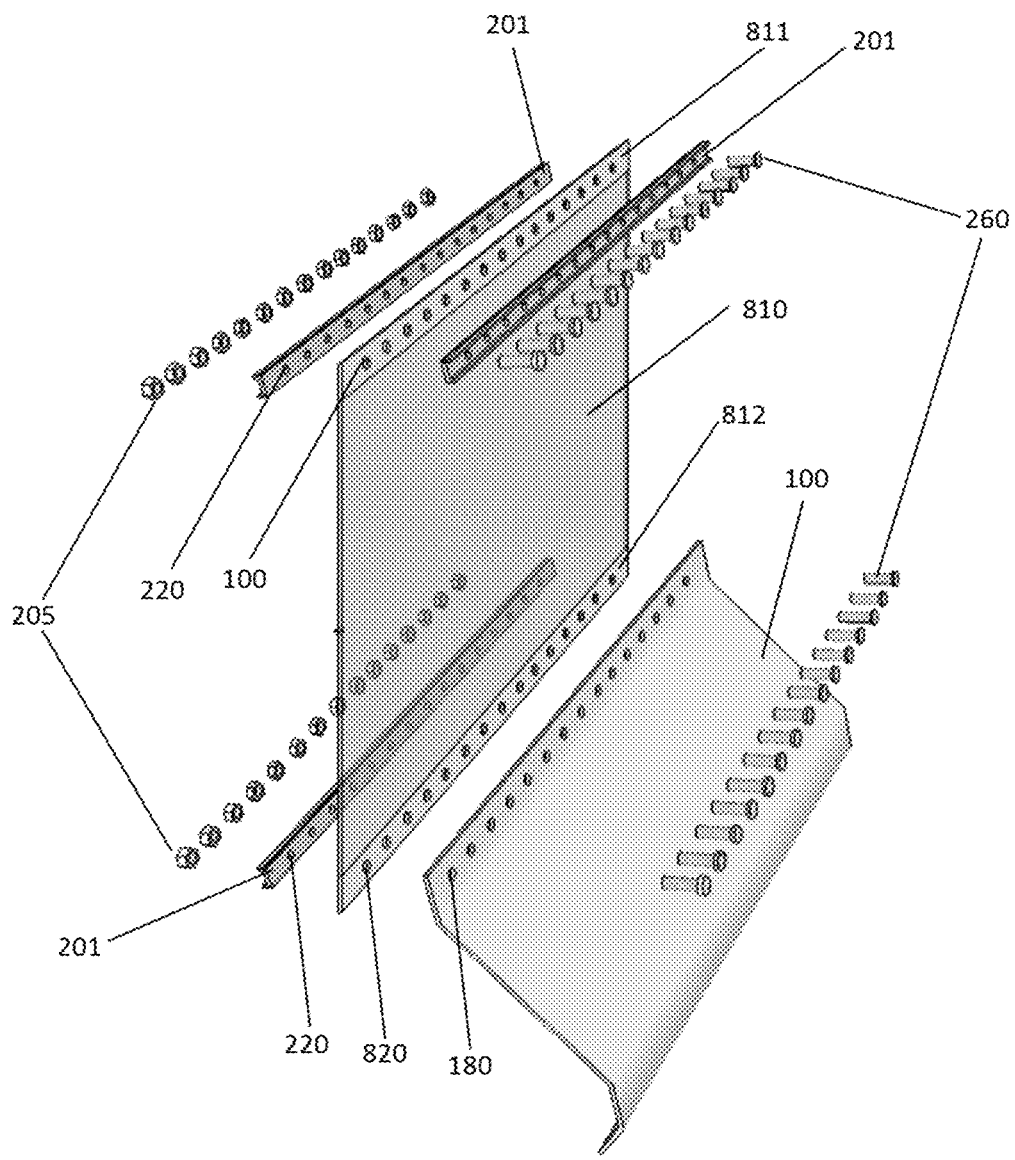
FIG. 12 is a perspective view of an embodiment of invention comprising a guard and vertical drape and means for securing the drape and guard to the stairway.

In one embodiment as illustrated in FIG. 12, the upper reinforcing panel (811) of the drape (800) may also be secured to the stairway through the use of two spreader bars (201) an inner spreader bar oriented to contact against the inside of the balusters and a second outer spreader bar, and fasteners (260) In this configuration, the upper reinforcing panel of the vertical drape (811) provides a series of apertures (820) enabling the passage of fasteners that are anchored against a spreader bar (201). When the fasteners (260) are tightened, the spreader bars (201) are drawn together compressing the drape (800) against the balustrade (not shown) creating a high static friction securing the upper extent of the drape in position on the balustrade. The apparatus may further comprise elastomeric gaskets disposed between the surfaces of the apparatus in contact with the balustrade to further enhance positioning and minimize damage.

Figure 13:
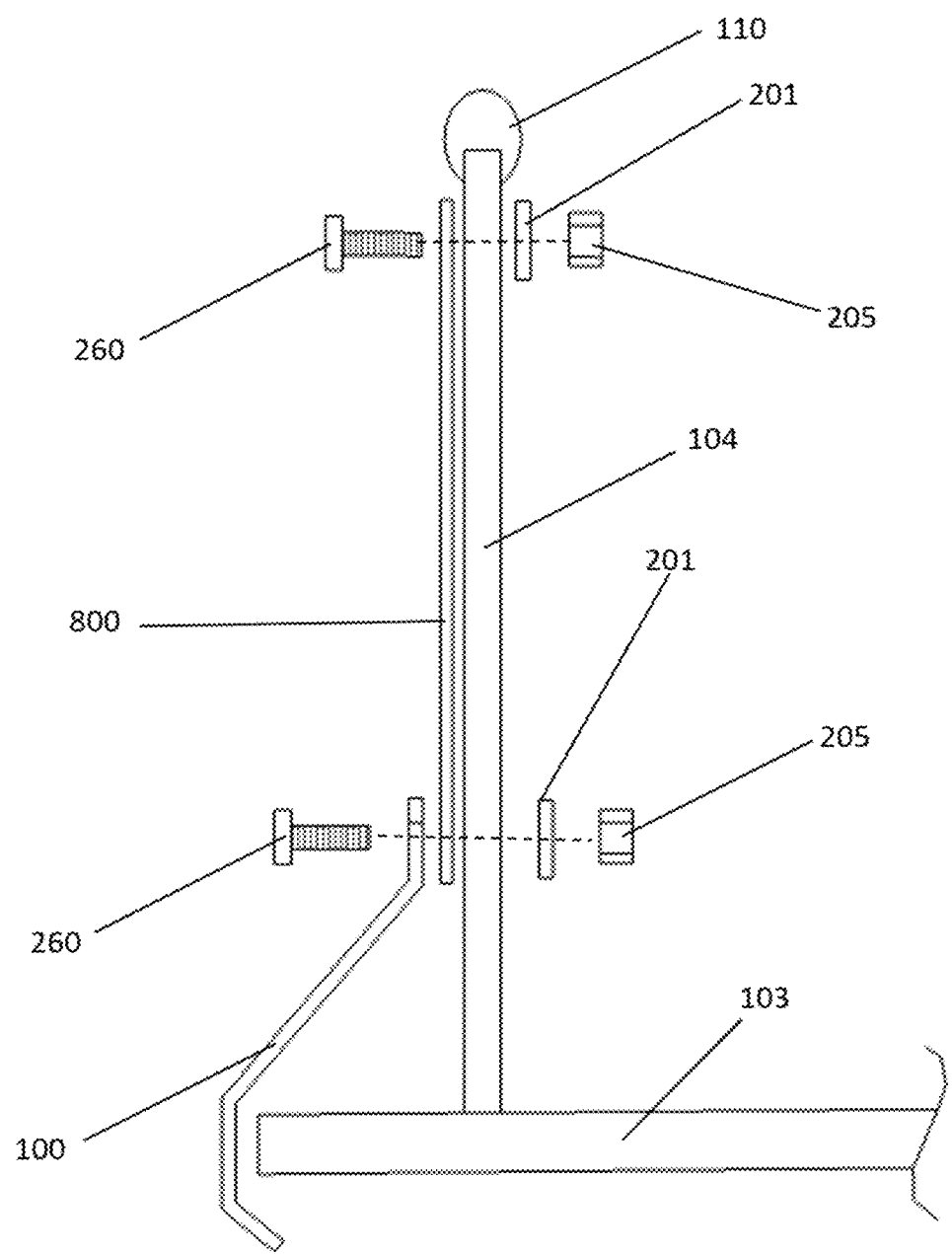
FIG. 13 is a cross section view of an embodiment of the invention comprising a guard and vertical drape and means for securing the drape and guard to the stairway illustrating the positioning of the components in relation to the stairway elements.

A further cross-sectional illustration of a typical configuration of the embodiment of the invention employing a guard and drape in association with a step of a stairway is provided in FIG. 13. As illustrated the drape (800) is provided in a vertical orientation on the outside of the balusters (104) secured at is upper extent near the handrail (110) by threaded fasteners (260) passing through apertures (not shown) in the drape (800) between the balusters (104) through apertures (not shown) in the spreader bar (201) and secured with a nut (205). Similarly, in this embodiment, the lower extent of the drape is secured by threaded fasteners (260) passing through apertures (not shown) in the guard (100) between the balusters (104) through apertures (not shown) in the spreader bar (201) and secured with a nut (205). As illustrated, the guard (100) extends over the end of the tread (103) and restricts access to the OTEP region of the tread.

Since the rise and run of stairways vary somewhat as does the height of the balusters/handrail, it is desirable to enable the drape to adapt to such variations while maintaining tautness in the fabric. As it is desirable to maintain the drape in a substantially vertical orientation, the drape may be constructed so as to adjust for such variances either by employing a stretchable fabric for the drape and/or employing stretchable fabric panels within the fabric drape to enable the drape to adapt to stairway and balustrade variances while remaining in a substantially vertical orientation. To accommodate larger variations in handrail height not compensable by employing stretch fabrics or stretch fabric panels, the vertical drape may provide rows of apertures in the upper and/or lower extent of the vertical drape, said rows of apertures being parallel to the upper and/or lower edges, respectively, of the drape, to facilitate vertical adjustment.

The vertical drape may be constructed of a fabric material. The term "fabric" as used herein refers to textiles (either of natural or synthetic fibers) as well as flexible plastic sheeting (e.g. polyethylene, vinyl) including fiber-reinforced plastic sheeting. The fabric may be continuous or discontinuous (e.g. mesh or screen fabric). When discontinuous or mesh fabrics are employed, the openings in the mesh should be smaller than the diameter of a finger of a child so that the child cannot reach through the fabric to gain access to the baluster. Examples of fibers useful in the construction of the fabric include but are not limited to nylon, polyesters (e.g., polyethylene terephthalate), elastomeric fabrics (e.g. spandex) and combinations thereof.

Handrail Guard

Figure 14:
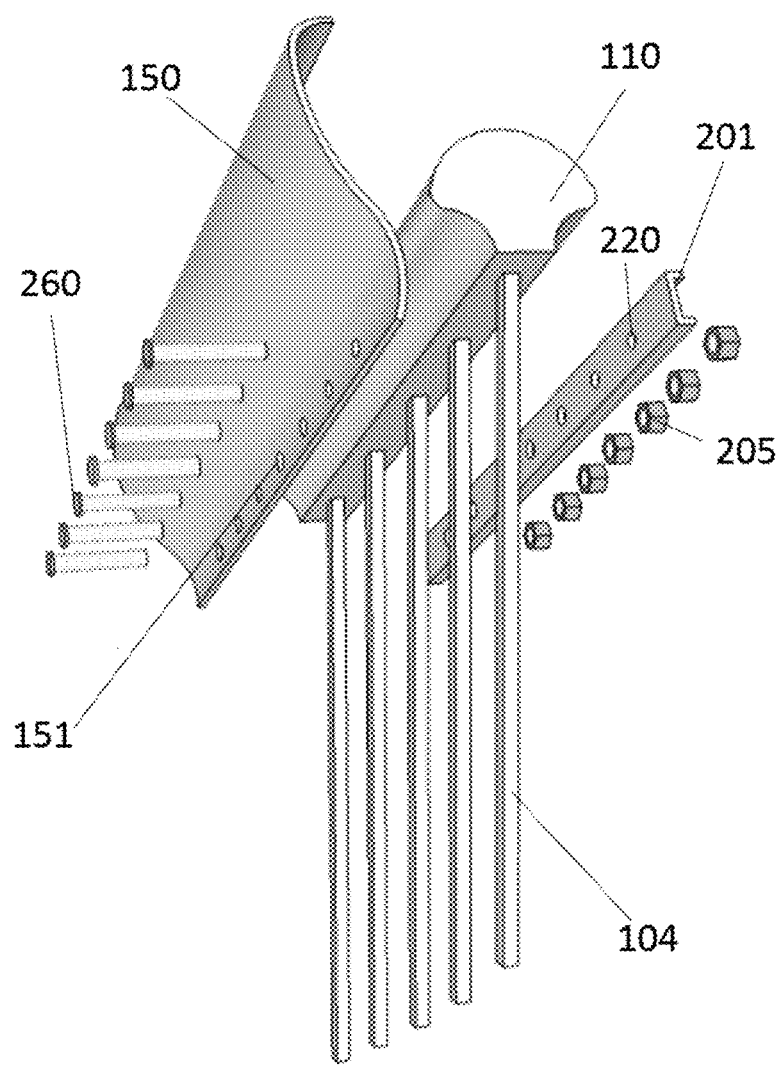
FIG. 14 is a perspective exploded view of a handrail guard and retention means illustrated in relation to the handrail and balusters.

To further minimize the ability of a child to climb the outside of the stairs by gaining a handhold on the handrail, the invention further provides an apparatus comprising guard, fabric drape and a handrail guard. The handrail guard extends longitudinally along the handrail and is affixed at its lower extent to the balustrade and extends outward and upward to prevent access to the handrail from below. An illustration of a handrail guard is provided in FIG. 14 of the drawings. FIG. 14 provides a lower perspective exploded view of the handrail guard (150) positioned relative to the handrail (110) as viewed from the outside of the balusters (104) illustrating the use of threaded fasteners (260) that pass through the apertures in the handrail guard (151), through the open spaces between the balusters (104) and through the apertures (220) in the spreader bar (201) to engage the nuts (205). When the fasteners are tightened, the fasteners (260) clamp the handrail guard (150) and spreader bar (201) together resulting in the handrail guard (150) being held securely in position on the balustrade. The handrail guard may be fabricated from an elastomeric material such that it precludes access to the handrail but if a child attempted to grab onto the handrail guard itself, the handrail guard would deform precluding its utility as a handhold. It should be noted that when a handrail guard is used in conjunction with the vertical drape system, the lower portion of the handrail guard provides a structure with plurality of fastener apertures may obviate the need for an second external spreader bar to secure the upper edge of the drape to the balustrade.

Materials

The guard, handrail guard and associated retention means may be constructed of any of a variety of materials including but not limited to metals, plastics, wood, compressed paper, glass, rigid foams, cardboard, and/or ceramics. Examples of metals useful in the construction guard include but are not limited to steel and steel alloys (e.g. stainless steel), aluminum and aluminum alloys, and magnesium and magnesium alloys. Metals may be formed using conventional techniques such as stamping, casting, machining, forging (including powder forging), hydroforming, thermoforming, compression molding, or the like. The guard and associated retention means may be constructed of the same material or combinations of differing materials.

Examples of plastic materials useful in the construction of the present invention are well known in the art and the techniques involved in the forming of the materials into the guard are apparent to the skilled artisan. The term plastics includes but are not limited to polycarbonate (PC), polyethylene (PE), high density polyethylene (HDPE), polyetherimide (PEI), polysulfone (PSO), polyethersulfone (PES), polyethylene terepthalate (PET), polypropylene, polystyrene, high impact polystyrene (HIPS), acrylanitrile butadiene styrene (ABS), polyvinylchloride (PVC), acetal, Nylons (e.g., Nylon 4-6, Nylone 6-6, Nylon 11, or Nylon 12), acrylic-styrene-acetonitrile (ASA), polyester liquid crystal polymer (LCP), styrene acrylonitrile (SAN), polyvinyldiene difluoride (PVDF), melamine, phenolics and the like. The guard may also be constructed of composite materials such as glass or carbon fiber reinforced plastics. Such composite materials may be formed using conventional contact molding technologies such as hand lay-up or spray lay-up technologies.

Typical procedures for forming the materials including compression molding, blow molding, casting, extrusion, pressure forming, and the like. The techniques for forming such plastic materials into the conformations of the present invention are well known to those of skill in the art (see e.g. Olmsted and Davis (2001) *Practical Injection Molding*, Marcel Dekker New York; Rosato and Rosato (1986) *Injection Molding Handbook*; Van Nostrand Reinhold Company, New York). The elements of the apparatus may also be produced by deposition forming (conventionally called "3D printing") using conventional materials such as plastic, metallic or metallic precursors.

The guard (and/or handrail guard) may further incorporate structural features to improve the rigidity of the guard (and/or handrail guard) and/or facilitate the attachment of other components. Such structural features enable the use of less material. Examples of such structural features include ribs or bosses. In one embodiment of the invention as illustrated in FIG. 7, the guard provides a longitudinal rib (320) to enhance rigidity.

Finishing:

In some instances, it may be desirable to provide a finish to the materials to minimize corrosion from atmospheric or operator sources or to improve durability, handing characteristics or appearance. The materials may optionally be electroplated, powder-coated, painted, dip-coated to enhance appearance and/or durability.

In one embodiment of the invention, the exterior surface of the guard is provided with an anti-friction coating to produce a low-friction surface. A low friction surface minimizes the ability of an individual to gain a foothold on the exterior surface of the guard itself.

The portions of the guard and attachment means that contact the stairway may be constructed of or provide additional cushioning materials to contact surfaces to minimize damage to the stairway. The portions of the internal surface of the guard in contact with the stairway as well of the contact surfaces of the attachment means (e.g. the portions of the spreader bar in contact with the balusters) may provide a non-slip surface to avoid accidental dislodgement.

Alarm System:

The apparatus of the present invention may further comprise an alarm system that provides an audible signal when pressure is applied to the guard.

When activated in response to one or more conditions, the alarm system may provide one or more alerts to that notify a human being of one or more hazardous conditions. Such hazardous conditions include but are not limited to: (a) pressure on the guard; (b) lack of, or low, power conditions of the power supply; and/or (c) lack of electrical continuity.

Alerts may be achieved by one or more of local alert generators including but not limited to: (a) an audible signal generator (e.g. bell, whistle, or siren) in electrical communication with the alert system and/or (b) a visual signal generator (e.g. flashing light) in electrical communication with the alert system.

In one embodiment, there is a pressure sensitive switch positioned between the guard and the point at which it contacts the stairway, said pressure sensitive switch being in electrical communication with a power supply and an audible signal generator (e.g. a bell, siren, or whistle).

In one embodiment, one of the alerts provided in response to activation of the alarm system activates a local alert generator that produces an audible signal sufficiently loud to induce distress in a child such that the child is deterred from climbing the outside of the stairway. Examples of such loud audible signals would generally be greater than approximately 80 db, alternatively greater than about 100 db, or alternatively greater than about 120 db.

In another embodiment, the alarm is actuated mechanically, for example where pressure on the guard actuates a mechanism which produces an audible signal (e.g. bell or whistle).

In one embodiment of the invention as illustrated in FIG. 7 of the attached drawings, the under surface of the guard (402) is provided with a tape switch (900). The tape switch is formed of conventional tape switch materials well known to those of skill in the art. In one embodiment of the invention, the tape switch is constructed of a tape switch material that may be cut to shape (commercially available from the Tapeswitch Corporation, 100 Schmitt Boulevard, Farmingdale, N.Y. 11735). The selection of the tape switch for use in the practice of the present invention will take into consideration the actuation force. The typical application of the system of the present invention is to provide an alert when small children climb the external portion of the stairway. The primary target population is small children that conventionally weigh less than about 40 kg. The contact surface area of a foot of a child is less than approximately 100 $cm^2$ (0.01 $m^2$). Consequently, the tape switch is generally configured to have an actuation force of less than approximately 0.4 $kg/cm^2$, alternatively less than about 0.2 $kg/cm^2$, alternatively less than about 0.1 $kg/cm^2$, or alternatively less than about 0.05 $kg/cm^2$.

Alternatively, or in addition to the local alert generators, the alarm system may provide a means to broadcast an electromagnetic signal (e.g., transmitter) by the alarm system to one or more remote alert devices (e.g. remote receivers capable of producing an alert) including remotely triggered audible signal generators, remotely triggered visual signal generators, cellular telephones or portable computing devices including smartphones, tablet or computers) that are in wireless communication with the system of the present invention. Examples of means for wireless communication include but are not limited to radio transmitters, telephone communications or wireless communication modules for communication in accordance with protocols such as Wi-Fi™ 802.11 a/b/g/n, Bluetooth®, or cellular data transfer protocols such as GSM®, 3G®, 4G®, LTE® and similar protocols for the wireless transfer of data. For example, the iPhone® series of devices possesses the ability to communicate via cellular connection protocols, Wi-Fi® protocols, and Bluetooth® protocols. In such instances, the alarm system will incorporate electrical components to facilitate such wireless connections such as a radio transmitter, Bluetooth® module, and/or Wi-Fi® module.

The alarm system of the present invention further provides a means for detection of a low power status of the power supply, conventionally involving the actuation of the alarm system to provide an alert to indicate a low power status. Such systems are well known in the art and are conventionally employed in smoke detectors that provide an audible "chirp" alarm to alert the user to a low power status of the power supply. In order to generate this audible chirp in response to a lack of power, the alarm system will conventionally be provided with an auxiliary internal power supply (e.g. a battery or batteries) sufficient to provide the alert for lack of power. In general, the actuation of the alert system is achieved when power drops below 40%, alternatively 30%, alternatively 20%, alternatively 10%, alternatively 5% or less of the full charge of the power supply.

In addition to (or in place of) the audible power status alert system described above, the system may also provide a visual indication of the power status comprising a meter, one or more lights (LEDs), or similar display that provides a visual indication of the power level of the power supply.

The alarm system may be hardwired using conventional electrical components to provide for a variety of alerts in response to system conditions. Alternatively, the alarm system may include a logic controller programmed to produce one or more alerts in response to a variety of conditions.

Power Supply:

In the practice of the present invention, the pressure sensitive mat(s) is/are in electrical communication with a power supply and an alarm system. The pressure sensitive mat and alarm system are in electrical communication with a power supply. The power supply may be conventional (60 hz/110 A in the USA) AC wall current supplied by conventional wiring to the apparatus. In many instances, it will be desirable to provide a lower power to the apparatus such as when using the pressure sensitive mats that may operate on a lower electrical power than conventional wall current or wireless communication equipment. Additionally, the use of lower power may be a safety feature minimizing the possibility of electric shock to a child that steps on the pressure sensitive mat. Consequently, a transformer or power adapter may be used to provide appropriate current for the electrical components that are designed to function on lower power.

Alternative to the use of wall current as a power supply, the power supply may be a portable power supply. A portable power supply expands the use of the apparatus of the present invention in those areas where a wired power supply may not be practical (e.g. basements or outdoors). Such portable power supply may comprise one or more batteries. The battery may be non-rechargeable or rechargeable. Examples of batteries useful in the practice of the present invention include zinc-carbon, zinc-chloride, alkaline (e.g., zinc-manganese dioxide), lithium (e.g., lithium-copper oxide, lithium-iron disulfide, lithium manganese dioxide), silver oxide, silver-zinc, nickel-cadmium (NiCd), nickel metal hydride (NiMH), nickel-zinc (NiZn), lithium ion batteries. The term battery includes a single cell or a plurality of two or more cells. When one or more rechargeable batteries are employed as the power source, the device of the present invention may also be provided with a external charging system appropriate for the particular configuration and specifications of the rechargeable battery employed and the platform providing a plug system for reversible association of the external charging system with the platform containing the rechargeable batteries.

The apparatus may also incorporate or be provided with a solar collector for charging the battery source. For purposes of shipment and extended shelf life, there may be an operator-removable physical barrier introduced between the power source and the circuitry of the remainder of the transmission module to preserve the battery power source during storage and shipment and guard against parasitic drain of the battery(ies).

Methods:

The invention further provides a method of deterring the external climbing of stairways comprising the step of affixing a guard that restricts external access to the OTEP region of a stairway. The invention further provides a method of deterring the external climbing of stairways comprising the step of affixing a guard and vertical drape apparatus to the stairway, said apparatus restricting access to the OTEP region of a stairway from the outside of the stairway and the balusters. The invention further provides a method of deterring the external climbing of stairways comprising the step of affixing a guard, vertical drape and handrail guard to the balustrade of a stairway, said apparatus restricts external access to the OTEP region of a stairway, the balusters and the handrail.

It is known that pets, particularly cats, will climb structures and objects in homes and reach heights from which a fall could cause injury or death. To address this potential risk, the invention provides a method for preventing pets from climbing to dangerous heights comprising the step of installing one or more guards of the present invention on a stairway. Generally speaking, such method would not include the use of a drape or a handrail guard, as non-primates would be unlikely to employ balusters or handrails during climbing. Such method for preventing pets from climbing to dangerous heights might require more guards or longer guards than those used to deter children from climbing, as some pets have the ability to jump or otherwise climb to heights unreachable by children without assistance.

Kits:

The present invention further provides a kit of parts comprising at least one guard, one or more retention means, fasteners and instructions for use. The present invention further provides a kit of parts comprising at least one guard, a vertical drape, associated retention means, fasteners and instructions for use. The present invention further provides a kit of parts comprising at least one guard, a vertical drape, a handrail guard, associated retention means, fasteners and instructions for use. Instructions may be provided in printed form, compact disc or for retrieval over computer systems such as the Internet by providing with the kit an access code or electronic "key".

The present invention further provides a kit of parts comprising at least one guard, a stairway gate, one or more retention means, fasteners and instructions for use. Stairway gates are well known in the art and are typically designed to prevent access to the walkline of the stairway. The present invention further provides a kit of parts comprising at least one least one guard, a stairway gate, one or more retention means, a vertical drape, fasteners and instructions for use. A combination of a stairway gate and the apparatus of the present invention provides enhanced stairway safety by deterring access to the stairway from both the inside and outside of the stairway. The present invention further provides a kit of parts comprising at least one guard, a vertical drape, a stairway gate, a handrail guard, associated retention means, fasteners and instructions for use.

We claim:

1. An apparatus adapted for use with a curved open stairway, said curved open stairway comprising a balustrade, said balustrade having an inner surface and an outer surface, said balustrade further comprising a handrail, said curved open stairway further comprising one more open end treads at least one of said open end treads having an open tread end protrusion (OTEP), said OTEP having an exposed upper surface, said apparatus comprising:
  a guard configured for mounting to said curved open stairway, said guard having an upper edge, a lower edge, a leading edge and a trailing edge, wherein said guard is capable of being removed from said open stairway and does not comprise a structural element of said curved open stairway, said guard being flexible along a longitudinal axis extending from said leading edge to said trailing edge, and
  a retention means, said retention means configured to maintain the upper edge of said guard in stable association with said outer surface of said balustrade of said curved open stairway,
wherein said guard is maintained in stable association with said curved open stairway by employment of said guard retention means and the upper edge of said guard extends above the OTEP of least one tread and the lower edge of said guard extends below the OTEP of least one tread and such that an exposed upper surface of at least one said OTEP is reduced.

2. The apparatus of claim 1 wherein said guard reduces the exposed upper surfaces of the OTEPs of 2 or more treads.

3. The apparatus of claim 1 wherein said guard reduces the exposed upper surfaces of the OTEPs of at least 3 treads.

4. The apparatus of claim 1 wherein the guard retention means includes one or more retention means selected from the group consisting of fasteners, adhesives, cable ties, elastic materials, Christmas tree fasteners, hook and loop fasteners, and spreader bars.

5. The apparatus of claim 1, wherein said guard retention means comprises at least one spreader bar.

6. The apparatus of claim 1 further comprising a vertical drape and a vertical drape retention means,
  said vertical drape having an upper edge and a lower edge, wherein said vertical drape is capable of being removed from said curved open stairway and does not comprise a structural element of said open stairway,
  said vertical drape retention means being configured to maintain the upper edge of said vertical drape in stable association with the upper portion of said outer surface of said balustrade below said handrail of said open stairway and the lower edge of said vertical drape extending to a lower portion of said balustrade to at least the point of attachment of the upper edge of said guard to said balustrade
  such that when said vertical drape is in stable association with said balustrade by vertical drape retention means a portion of the outer surface of said balustrade is covered by said vertical drape.

7. The apparatus of claim 6 wherein the vertical drape retention means comprises at least two spreader bars.

8. The apparatus of claim 6 further comprising an alarm system, said alarm system providing an alert in response to pressure being applied to said guard.

9. The apparatus of claim 1 wherein said guard comprises one or more corrugations said corrugations extending from the upper edge of said guard to the lower edge of said guard.

10. The apparatus of claim 1 wherein said guard comprises a plurality of vertical sections of greater and lesser flexibility, said regions of lesser flexibility enabling curvature of said guard along said longitudinal axis.

11. A kit of parts comprising at least one guard, said guard being adapted for mounting to a curved open stairway, said guard having an upper edge, a lower edge, a leading edge and a trailing edge, wherein said guard is capable of being removed from said curved open stairway and does not comprise a structural element of said curved open stairway, said guard being flexible along a longitudinal axis extending from said leading edge to said trailing edge, said curved open stairway comprising one more open end treads at least one of said open end treads having an open end tread protrusion (OTEP), said OTEP having an exposed upper surface, and wherein said guard is capable of being removed from and does not comprise a structural element of said open stairway, a guard retention means configured to maintain the upper edge of said guard in stable association with the balustrade of said open stairway and the lower edge of said guard, when stably associated with said stairway employing said guard retention means, extends below the OTEP of at least one tread of at least one step of said open stairway, and instructions for use.

12. The kit of claim 11 further comprising a vertical drape and a vertical drape retention means said vertical drape retention means configured to maintaining said drape in stable association with said outer surface of said balustrade of said open stairway.

13. A method of deterring the external climbing of a curved open stairway, said open stairway comprising a balustrade, said balustrade having an inner surface and an outer surface, said balustrade further comprising a handrail, said curved open stairway having one more open end treads at least one of said open end treads having an open tread end protrusion (OTEP), said OTEP having an exposed surface, said method comprising the steps of:
  mounting to said curved open stairway an apparatus comprising a guard configured for mounting to said curved open stairway, said guard having an upper edge, a lower edge, a leading edge and a trailing edge, wherein said guard is capable of being removed from said open stairway and does not comprise a structural element of said curved open stairway, said guard being flexible along a longitudinal axis extending from said leading edge to said trailing edge, and
  securing the upper edge of said guard to the balustrade of said open stairway using a guard retention means, said guard retention means configured to maintain the upper edge of said guard in stable association with said balustrade of said curved open stairway,
  such that when said apparatus is mounted to said curved open stairway, said guard is maintained in stable association with said curved open stairway, the upper edge of said guard extends above the OTEP of least one tread and the lower edge of said guard extends below the OTEP of least one tread and such that exposed upper surface at least one said OTEP is reduced such that external climbing said curved open stairway is deterred.

14. The method of claim 13 wherein said method further comprising the step of mounting to said curved open stairway a vertical drape that is fitted to the outer surface of the balustrade of said curved open stairway said vertical drape extending upward from the upper edge of said guard to a point below the handrail employing a vertical drape retention means said vertical drape retention means configured to maintain said drape in stable association with said curved open stairway such that when said vertical drape is in stable association with said balustrade by vertical drape retention means at least a portion of the outer surface of said balustrade is covered by said vertical drape.

* * * * *